(12) United States Patent
Miller

(10) Patent No.: US 10,589,506 B2
(45) Date of Patent: Mar. 17, 2020

(54) ADJUSTABLE GLOSS LEVEL FOR COMPACT PRINTHEAD ARRANGEMENT

(71) Applicant: NIKE, Inc., Beaverton, OR (US)

(72) Inventor: Todd W. Miller, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 142 days.

(21) Appl. No.: 15/287,529

(22) Filed: Oct. 6, 2016

(65) Prior Publication Data

US 2017/0120520 A1 May 4, 2017

Related U.S. Application Data

(60) Provisional application No. 62/248,559, filed on Oct. 30, 2015, provisional application No. 62/248,532, filed on Oct. 30, 2015.

(51) Int. Cl.
| | |
|---|---|
| *B29C 64/112* | (2017.01) |
| *B29C 64/209* | (2017.01) |
| *B29C 64/264* | (2017.01) |
| *B33Y 30/00* | (2015.01) |
| *B33Y 70/00* | (2015.01) |
| *B33Y 10/00* | (2015.01) |
| *B41J 11/00* | (2006.01) |
| *B41J 2/21* | (2006.01) |
| *B41J 3/407* | (2006.01) |

(52) U.S. Cl.
CPC ............ *B33Y 10/00* (2014.12); *B29C 64/112* (2017.08); *B29C 64/209* (2017.08); *B29C 64/264* (2017.08); *B33Y 30/00* (2014.12); *B33Y 70/00* (2014.12); *B41J 2/2114* (2013.01); *B41J 3/407* (2013.01); *B41J 11/002* (2013.01); *B29K 2995/002* (2013.01); *B29K 2995/0022* (2013.01)

(58) Field of Classification Search
CPC .... B29C 64/112; B29C 64/209; B29C 64/264
See application file for complete search history.

(56) References Cited

U.S. PATENT DOCUMENTS

| 7,056,559 B2 | 6/2006 | Nakajima |
| 8,424,993 B2 | 4/2013 | Ikehata et al. |

(Continued)

FOREIGN PATENT DOCUMENTS

| CN | 1484584 A | 3/2004 |
| GB | 2470067 | 11/2010 |

(Continued)

OTHER PUBLICATIONS

Partial machine translation of JP 2005-313558A dated Nov. 2005 obtained from the espace website. (Year: 2005).*

(Continued)

*Primary Examiner* — Robert B Davis
(74) *Attorney, Agent, or Firm* — Klarquist Sparkman, LLP

(57) ABSTRACT

A method and apparatus for printing 2D layers and 3D structures is disclosed. The method includes dispensing a print material from a printhead assembly onto a base and curing the print material with a curing device assembly. The spacing between the printhead assembly and the curing device assembly can be adjusted to vary gloss levels in a printed feature. The printhead assembly can include at least one row of nozzles with colored inks and at least one row of nozzles with a clear structural print material.

23 Claims, 18 Drawing Sheets

(56) References Cited

U.S. PATENT DOCUMENTS

| | | |
|---|---|---|
| 8,944,583 B2 | 2/2015 | Waschnig |
| 2004/0069182 A1 | 4/2004 | Nakajima |
| 2004/0141040 A1 | 7/2004 | Nakajima |
| 2004/0227798 A1 | 11/2004 | Nakajima |
| 2006/0227194 A1 | 10/2006 | Hoshino |
| 2007/0046719 A1 | 3/2007 | Yamanobe et al. |
| 2007/0256778 A1 | 11/2007 | Fusco |
| 2007/0279451 A1 | 12/2007 | Mizoguchi et al. |
| 2009/0034998 A1 | 2/2009 | Omata |
| 2009/0225143 A1 | 9/2009 | Fukui |
| 2009/0244230 A1 | 10/2009 | Ohnishi et al. |
| 2009/0304952 A1 | 12/2009 | Kritchman |
| 2010/0154244 A1 | 6/2010 | Kuta |
| 2011/0157272 A1 | 6/2011 | Ikehata et al. |
| 2011/0304674 A1 | 12/2011 | Sambhy et al. |
| 2012/0287212 A1 | 11/2012 | Chretien et al. |
| 2012/0293575 A1 | 11/2012 | Shimada et al. |
| 2014/0020191 A1* | 1/2014 | Jones .................. A43B 3/0084 12/142 R |
| 2014/0340456 A1 | 11/2014 | Waschnig |
| 2015/0231897 A1 | 8/2015 | Noell |
| 2015/0273868 A1 | 10/2015 | Vodopivec et al. |
| 2015/0375530 A1 | 12/2015 | Andrea-Tallada et al. |
| 2017/0036460 A1* | 2/2017 | Cong .................. B41M 7/0081 |

FOREIGN PATENT DOCUMENTS

| | | |
|---|---|---|
| JP | 2005-313558 A | 11/2005 |
| JP | 2010-005934 A | 1/2010 |
| JP | 2013-188962 A | 9/2013 |
| WO | WO 02/053383 A2 | 7/2002 |
| WO | WO 2013/056292 A1 | 4/2013 |

OTHER PUBLICATIONS

Partial machine translation of JP 2013-188962A dated Sep. 2013 obtained from the espace website. (Year: 2013).*

International Search Report and Written Opinion, dated Jan. 20, 2017, in International Patent Application No. PCT/US2016/055985, 16 pages.

Office Action, dated Oct. 18, 2017, for Taiwan Patent Application No. 105133941, 16 pages, with English-language translation.

English abstract of Japanese Patent Publication No. JP 2010-005934, published Jan. 14, 2010.

English abstract of Japanese Patent Publication No. JP 2013-188962, published Sep. 26, 2013.

International Search Report and Written Opinion dated Jan. 17, 2017, issued by the European Patent Office in Patent Cooperation Treaty Application No. PCT/US2016/055973, filed Oct. 7, 2016.

Office Action issued in Taiwanese Patent Application No. 105133861, dated Nov. 21, 2017, with English translation (23 pages).

* cited by examiner

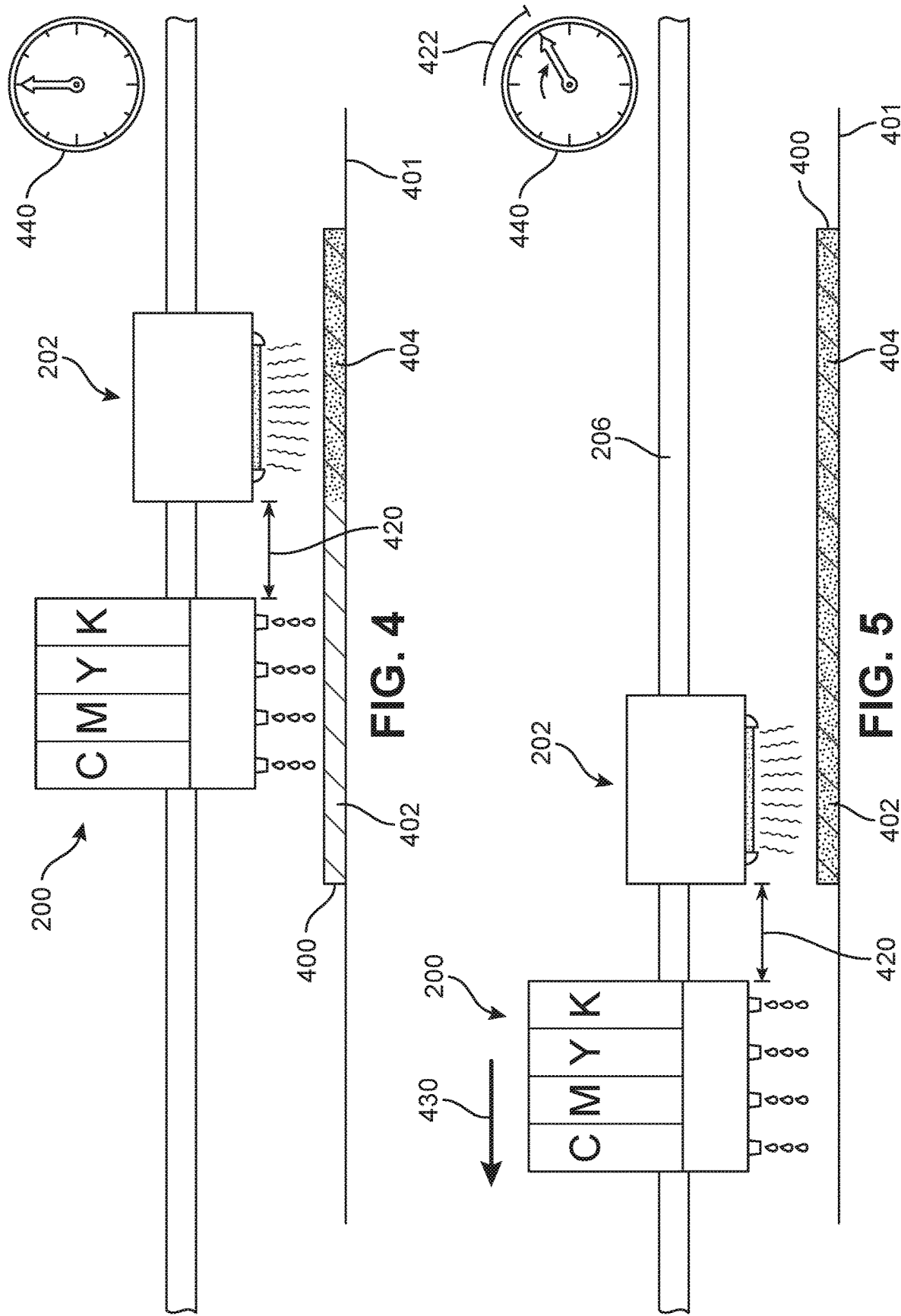

ADJUSTABLE GLOSS LEVEL FOR COMPACT PRINTHEAD ARRANGEMENT

CROSS-REFERENCE TO RELATED APPLICATIONS

This application claims priority to U.S. Provisional Patent Application 62/248,559, filed Oct. 30, 2015, and titled "Adjusted Gloss Level for Compact Printhead Design", the entirety of which is herein incorporated by reference. This application further claims priority to Miller, U.S. Provisional Application No. 62/248,532, filed Oct. 30, 2015, titled "Adjustable Gloss Level for Printing", the entirety of which is herein incorporated by reference.

BACKGROUND

The present embodiments relate generally to printing systems; including three-dimensional printing systems and methods.

Printing systems can be used to print 2D structures or layers of ink as well as 3D structures formed from various kinds of 3D printing materials. Three-dimensional printing systems and methods may be associated with various technologies including fused deposition modeling (FDM), electron beam freeform fabrication (EBF), selective laser sintering (SLS) as well as other kinds of three-dimensional printing technologies.

Structures formed from three-dimensional printing systems can be used with objects formed by other manufacturing techniques. These include textile materials used in various articles of footwear and/or articles of apparel.

When printing in 2D and/or 3D, the resulting outer surface of a printed element (i.e., the surface of an ink layer or the surface of a 3D printed structure) may have various kinds of finishes. One possible kind of finish is a gloss level, which can range from, for example, matte to high gloss.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

FIG. 4 is a side schematic view of an embodiment of a printhead assembly working with a curing device;

FIG. 5 is a side schematic view of an embodiment of a printhead assembly working with a curing device, after the printhead assembly and curing device have translated from the position shown in FIG. 4;

DETAILED DESCRIPTION

The embodiments include methods and an apparatus for printing and curing a 2D or 3D structure with target (i.e., predetermined) gloss levels in various regions. The system utilizes a compact printhead assembly that includes a row of color printing nozzles for dispensing color (or non-structural) print materials disposed next to a row of structural printing nozzles for printing structural print materials. A set of curing devices for curing color and structural print materials, respectively, may be spaced apart from the printhead assembly according to a desired target gloss level. The printhead assembly and the curing device are moved along tracks or rails of a printing device. The type of gloss level achieved may be increased (i.e., moved from matte to more glossy) by increasing the separation distance between the printhead assembly and the curing device before a print job.

Other systems, methods, features, and advantages of the embodiments will be, or will become, apparent to one of ordinary skill in the art upon examination of the following figures and detailed description. It is intended that all such additional systems, methods, features, and advantages be included within this description, be within the scope of the embodiments, and be protected by the following claims.

Figure 1:
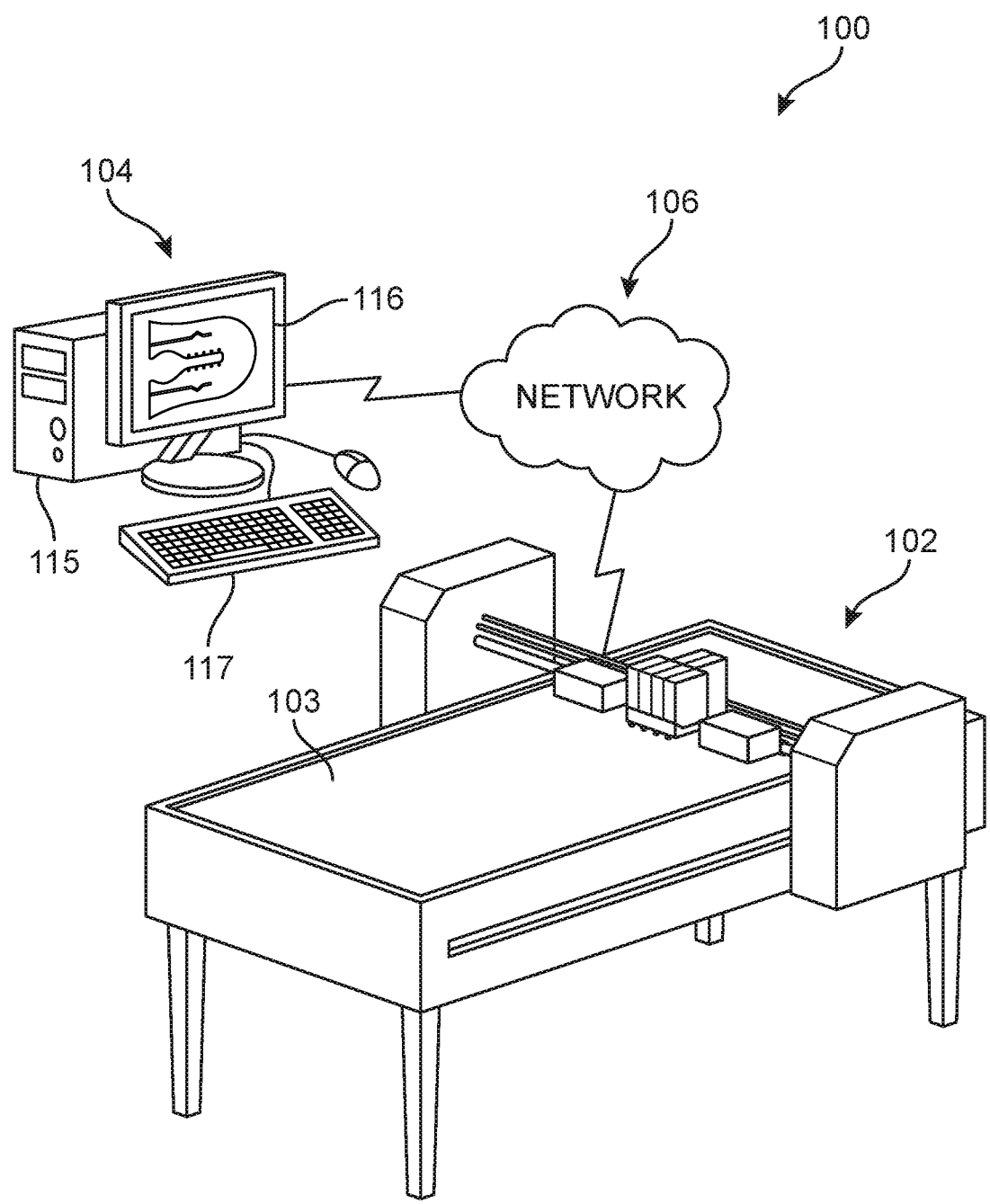
FIG. 1 is a schematic view of an embodiment of a printing system.

FIG. 1 is a schematic view of an embodiment of three-dimensional printing system 100, also referred to simply as printing system 100. Some embodiments of the printing system can include provisions that distribute one or more functions among different devices of the printing system. As shown, printing system 100 may include printing device 102, computing system 104, and network 106. In other embodiments, the printing system may be a single device or component (not shown).

As used herein, the terms "printer," "plotter," "three-dimensional printer," or "three-dimensional printing system" may refer to any type of system that can print multiple layers onto a substrate, a fabric, an article of footwear, an article of apparel, or other article. In one embodiment, printing device 102 could be a sign and graphics printer.

Printing system 100 may utilize various types of printing techniques. These can include, but are not limited to, toner-based printing, liquid inkjet printing, solid ink printing, dye-sublimation printing, inkless printing (including thermal printing and UV printing), MicroElectroMechanical Systems (MEMS) jet printing technologies as well as any other methods of printing.

Some embodiments may use additive manufacturing techniques or three-dimensional printing techniques. Three-dimensional printing, or "3D printing," comprises various technologies that may be used to form three-dimensional objects by depositing successive layers of material on top of one another. Exemplary 3D printing technologies that could be used include, but are not limited to, fused filament fabrication (FFF), electron beam freeform fabrication (EBF), direct metal laser sintering (DMLS), electron beam melting (EMB), selective laser melting (SLM), selective heat sintering (SHS), selective laser sintering (SLS), plaster-based 3D printing (PP), laminated object manufacturing (LOM), stereolithography (SLA), digital light processing (DLP) as well as various other kinds of 3D printing or additive manufacturing technologies known in the art. Structures formed from three-dimensional printing systems can be used with objects formed by other manufacturing techniques. These include textile materials used in various articles of footwear, articles of apparel, and/or protective articles.

Some of the exemplary embodiments depict printing three-dimensional structures onto an article (e.g., an upper for footwear); however, other embodiments may utilize the principles discussed herein for printing and curing print material for any application. In some other embodiments, for example, the principles discussed herein could be used to print and cure thin films or layers of print material, such as may be used in printing a graphic or indicia onto a substrate. As used in this detailed description and in the claims, the term "printable feature" refers to any layer, portion, or structure formed by printing (e.g., ejection from a nozzle). In some cases, a printable feature may be one or more layers of ink, as may be deposited by a conventional inkjet printer. In other cases, a printable feature could be a 3D structural feature that has been printed onto a substrate using a structural print material, such as thermoplastic materials.

In some cases, printing system 100 may make use of a combination of two or more different printing techniques. For example, in some embodiments, coloring inks may be printed as thin layers while clear or opaque print materials may be printed to form structural layers of a printed object or form. The type of printing technique used may vary according to factors including, but not limited to, material of the target article, size, and/or geometry of the target article, desired properties of the printed image (such as durability, color, ink density, etc.) as well as printing speed, printing costs, and maintenance requirements.

Additive manufacturing processes may be used to form structures on flat receiving surfaces as well as on contoured or non-flat surfaces. For example, some embodiments depicted in the figures may illustrate methods whereby a material is printed onto a flattened surface of an article, such as a material section of an upper that has a flat or unassembled configuration. In such cases, printing the material onto the surface may be accomplished by depositing the material in thin layers that are also flat. Thus, a printhead or nozzle may move in one or more horizontal directions to apply an Nth layer of material and then move in the vertical direction to begin forming the N+1 layer. However, it should be understood that in other embodiments the material could be printed onto a contoured or non-flat surface. For example, material could be printed onto a three-dimensional last, where the surface of the last is not flat. In such cases, the printed layers applied to the surface may also be contoured. In order to accomplish this method of printing, a printhead or nozzle may be configured to move along a contoured surface and tilt, rotate, or otherwise move so that the printhead or nozzle is always aligned approximately normal to the surface where the printed material is being applied. In some cases, a printhead could be mounted to a robotic arm, such as an articulated robotic arm with 6 degrees of freedom. Alternatively, in still other embodiments, an object with a contoured surface could be reoriented under a nozzle so that contoured layers of printed material could be applied to the object. For example, embodiments could make use of any of the systems, features, components, and/or methods disclosed in Mozeika et al., U.S. Patent Publication Number 2013/0015596, published Jan. 17, 2013 (and filed as U.S. application Ser. No. 13/530,664 on Jun. 22, 2012), titled "Robotic fabricator," the entirety of which is herein incorporated by reference. Embodiments could also make use of any of the systems, features, components, and/or methods disclosed in Cannell et al., U.S. Pat. No. 8,123,350, issued Feb. 28, 2012, titled "Computerized apparatus and method for applying graphics to surfaces," the entirety of which is herein incorporated by reference. Thus, it may be appreciated that the present embodiments are not limited to printing processes used for printing to flat surfaces and may be used in conjunction with printing systems that can print to any kinds of surfaces having any kinds of geometry.

Generally, embodiments could apply any kind of print material to a substrate. As used herein, the term "print material," "printing material," or "printable material" refers to any material that can be printed, ejected, emitted, or otherwise deposited during an additive manufacturing process. Exemplary print materials include inks as well as resins, plastics, or other print materials associated with 2D and/or 3D printing. In some embodiments, the materials used in the printing technology could be any aqueous ink, dye-based ink, pigment-based ink, solvent-based ink, dye-sublimation ink, thermoplastics (e.g., PLA and ABS) and thermoplastic powders, acrylic resin, polyurethane, thermoplastic polyurethane, silicone, or any other curable substance. Still further examples of materials include high-density polyurethylene, eutectic metals, rubber, modeling clay, plasticine, RTV silicone, porcelain, metal clay, ceramic materials, plaster, and photopolymers, as well as possibly other materials known for use in 3D printing.

In some embodiments, a print material may be any material that is substantially moldable and/or pliable above a predetermined temperature, such as a glass-transition temperature and/or a melting temperature. In one embodiment, a print material has one or more thermal properties such as a glass-liquid transition ("glass transition") temperature and/or a melting temperature. For example, the print material may be a thermoplastic material having a glass-transition temperature and a melting temperature. As used herein, thermoplastic materials may include, for example, acrylic, nylon, polybenzimidazole, polyethylene, polypropylene, polystyrene, polyvinyl chloride, polytetrafluoroethylene (PTFE), and the like.

In some embodiments, a print material may be UV curable. Generally, any appropriate type of UV-curable print material, including acrylic resin, polyurethane, TPU, silicone, or any other appropriate print material could be used.

Some embodiments of the printing system can include provisions that permit printed structures to be printed directly onto one or more articles. The term "articles" is intended to include both articles of footwear (e.g., shoes) and articles of apparel (e.g., shirts, pants, etc.). As used throughout this disclosure, the terms "article of footwear" and "footwear" include any footwear and any materials associated with footwear, including an upper, and may also be applied to a variety of athletic footwear types, including baseball shoes, basketball shoes, cross-training shoes, cycling shoes, football shoes, tennis shoes, soccer shoes, and hiking boots, for example. As used herein, the terms "article of footwear" and "footwear" also include footwear types that are generally considered to be nonathletic, formal, or decorative, including dress shoes, loafers, sandals, slippers, boat shoes, and work boots.

While the disclosed embodiments are described in the context of articles of footwear, various embodiments may further be equally applied to any article of clothing, apparel, or equipment that includes three-dimensional printing. For example, various embodiments may be applied to hats, caps, shirts, jerseys, jackets, socks, shorts, pants, undergarments, athletic support garments, gloves, wrist/arm bands, sleeves, headbands, any knit material, any woven material, any nonwoven material, sports equipment, etc. Thus, as used herein, the term "article of apparel" may refer to any apparel or clothing, including any article of footwear, as well as hats, caps, shirts, jerseys, jackets, socks, shorts, pants, undergarments, athletic support garments, gloves, wrist/arm bands, sleeves, headbands, any knit material, any woven material, any nonwoven material, and the like.

In order to apply printed materials directly to one or more articles, printing device 102 may be capable of printing onto the surfaces of various kinds of materials. Specifically, in some cases, printing device 102 may be capable of printing onto the surfaces of various materials such as textile, natural fabric, synthetic fabric, knit, woven material, nonwoven material, mesh, leather, synthetic leather, polymer, rubber, and foam, or any combination of them, without the need for a release layer interposed between a substrate and the bottom of the printed material, and without the need for a perfectly or near-perfectly flat substrate surface on which to print. For example, the disclosed methods may include printing a resin, acrylic, thermoplastic material, or ink material onto a fabric, for example, a knit material, where the material is adhered/bonded to the fabric and where the material does not generally delaminate when flexed, rolled, worked, or subject to additional assembly processes/steps. As used throughout this disclosure, the term "fabric" may be used to refer generally to materials chosen from any textile, natural fabric, synthetic fabric, knit, woven material, nonwoven material, mesh, leather, synthetic leather, polymers, rubbers, and foam.

In some embodiments, printing system 100 can include provisions that control and/or receive information from printing device 102. These provisions can include computing system 104 and network 106. Generally, the term "computing system" refers to the computing resources of a single computer, a portion of the computing resources of a single computer, and/or two or more computers in communication with one another. Any of these resources can be operated by one or more human users. In some embodiments, computing system 104 may include one or more servers. In some embodiments, a print server may be primarily responsible for controlling and/or communicating with printing device 102, while a separate computer (e.g., desktop, laptop, or tablet) may facilitate interactions with a user. Computing system 104 can also include one or more storage devices including, but not limited to, magnetic, optical, magneto-optical, and/or memory, including volatile memory and non-volatile memory.

In those instances where a computing system is used, any suitable hardware or hardware systems may be used to facilitate provisions that control and/or receive information from printing device 102. In some embodiments, where a computing system is used, computing system 104 may include central processing device 115, viewing interface 116 (e.g., a monitor or screen), input devices 117 (e.g., keyboard and mouse), and software for designing a computer-aided design (CAD) representation of a printed structure. However, in other embodiments, other forms of hardware systems may be used.

In those instances where software for designing a computer-aided design representation of a printed structure is used, any suitable information may be used to facilitate provisions for designing a computer-aided design representation of a printed structure. In at least some embodiments, the computer-aided design representation of a printed layer and/or printed structure may include not only information about the geometry of the structure but also information related to the materials required to print various portions of the structure. However, in other embodiments, different information may be used.

In those instances where software for designing a computer-aided design representation of a printed structure is used, any suitable design structure may be used to transform the design into information that can be interpreted by printing device 102 (or a related print server in communication with printing device 102). In some embodiments, printing system 100 may be operated as follows to provide one or more structures that have been formed using a three-dimensional printing, or additive, process. Computing system 104 may be used to design a structure. This may be accomplished using some type of CAD software or other kind of software. The design may then be transformed into information that can be interpreted by printing device 102 (or a related print server in communication with printing device 102). In some embodiments, the design may be converted to a three-dimensional printable file, such as a stereolithography file (STL file); in other cases, the design may be converted into a different design structure. In still other embodiments, information about a structure to be printed may be sent in the form of an image file in which case image information (colors, hues, shades, transparency, etc.) of different regions can be used to determine a corresponding 3D structure.

In those instances where a network is used, network 106 may use any wired or wireless provisions that facilitate the exchange of information between computing system 104 and printing device 102. In some embodiments, network 106 may further include various components such as network interface controllers; repeaters, hubs, bridges, switches, routers, modems, and firewalls. In some embodiments, network 106 may be a wireless network that facilitates wireless communication between two or more systems, devices, and/or components of printing system 100. Examples of wireless networks include, but are not limited to, wireless personal area networks (including, for example, Bluetooth), wireless local area networks (including networks utilizing the IEEE 802.11 WLAN standards), wireless mesh networks, mobile device networks as well as other kinds of wireless networks. In other cases, network 106 could be a wired network including networks whose signals are facilitated by twister pair wires, coaxial cables, and optical fibers. In still other cases, a combination of wired and wireless networks and/or connections could be used.

As discussed, a printing system may distribute various functionality across one or more devices or systems. In those instances where the printing system includes provisions that distribute one or more functions among different devices of printing system 100, any suitable protocol, format, and method may be used to facilitate communication among the devices of printing system 100. In some embodiments, these communications are conducted using network 106; in other cases, these communications may be conducted directly between devices of printing system 100.

Printing device 102 may include a receiving surface, or printing surface, where an article, or more generally a base element (textile, etc.), can be placed for printing. In FIG. 1, printing device 102 includes a table-like structure with printing surface 103.

Figure 2:
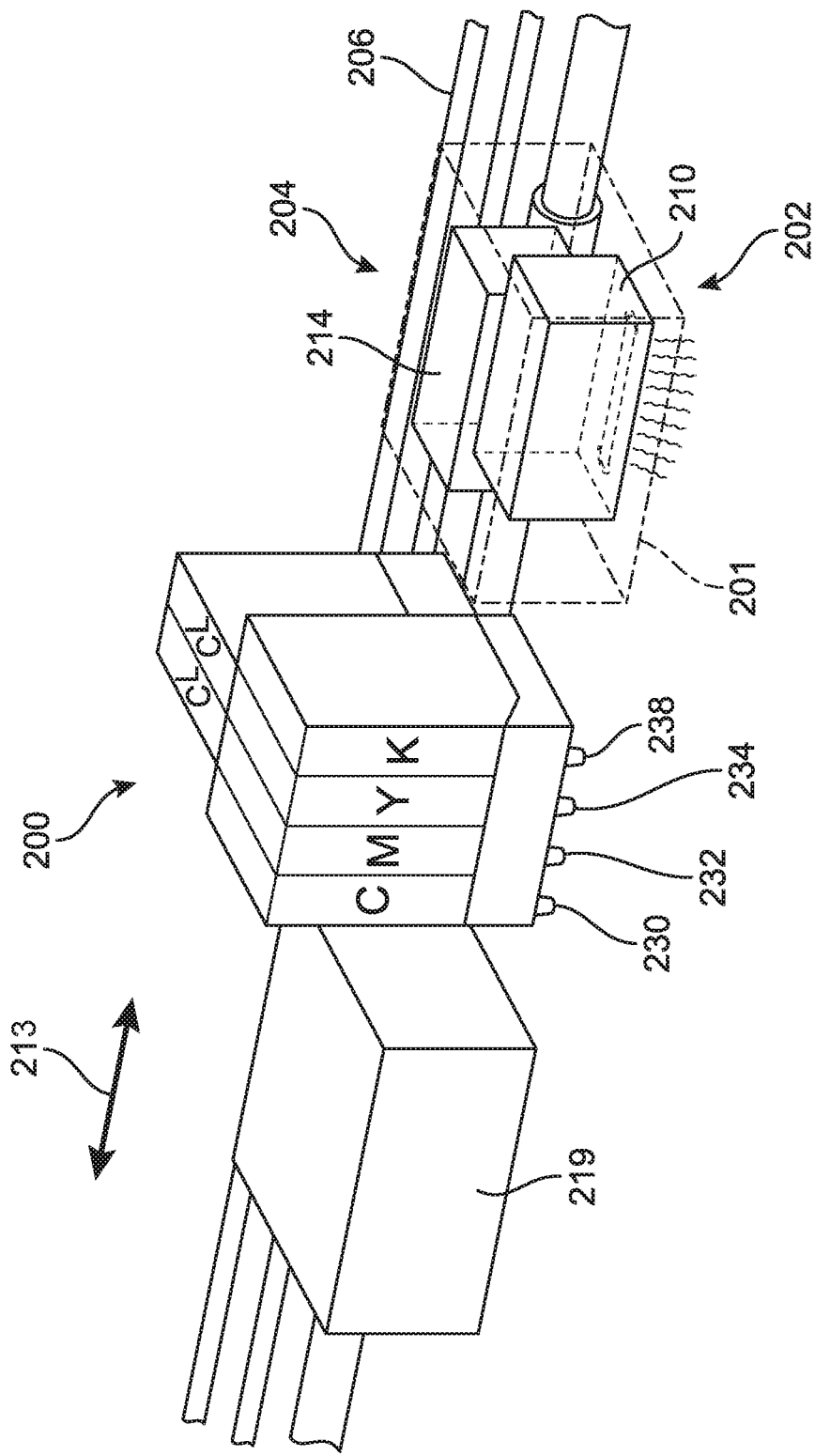
FIG. 2 is a schematic view of an embodiment of some components of the printing system of FIG. 1.

FIG. 2 illustrates a schematic view of an enlarged portion of some components of printing device 102 (see FIG. 1). Specifically, FIG. 2 shows printhead assembly 200 as well as a curing device assembly 202. In the embodiment of FIG. 2, printhead assembly 200 and curing device assembly 202 are further mounted to actuating system 204. In some cases, actuating system 204 may include various provisions for facilitating the movement of printhead assembly 200 and/or curing device assembly 202. In one embodiment, actuating system 204 includes one or more rails 206. Printhead assembly 200 and curing device assembly 202 could be mounted to rails 206 using one or more actuating devices, which allow printhead assembly 200 and curing device assembly 202 to be attached to, and transported along, rails 206 (i.e., in directions aligned with longitudinal axis 213 of print device 102).

In at least some embodiments, a printing device may include two separate curing device assemblies disposed on opposing sides of a printhead. Such a configuration allows for a curing device assembly to trail 'behind' a printhead regardless of the motion of direction of the printhead (i.e., left or right along axis 213). In the embodiment of FIGS. 1-2, a second curing device assembly is shown (curing device assembly 219 in FIG. 2). However, for purposes of illustration, curing device assembly 219 is omitted from the remaining figures since the operation of this second curing device assembly may be the same as the operation of curing device assembly 202.

For purposes of clarity, the actuating devices that control the motion of printhead assembly 200 and curing device assembly 202 are not shown in FIG. 2. However, it may be understood that any known systems, devices, or methods for moving printheads and/or curing lamps to various positions within a printer or similar device could be used. Such provisions may include various kinds of electric motors, or other drive devices known in the art for use in printers. Moreover, in some embodiments, a single actuating device can be used to move a printhead assembly and a curing device assembly simultaneously such that the printhead assembly and curing device assembly cannot move independently of one another during a print job or print run. However, in other embodiments, it is contemplated that independent actuators could be used with a printhead assembly and a curing device assembly, which may allow for independent motion of these assemblies with respect to one another. Such a dynamic configuration is disclosed in Miller, U.S. Patent Publication Number 2017-0120650, filed Oct. 6, 2016, titled "Adjustable Gloss Level for Printing," the entirety of which is herein incorporated by reference.

Some embodiments of the printing device can include provisions that permit color printing. In some embodiments, the printing system may use CMYK printing. In other embodiments, the color printing may be conducted using another suitable printing method.

In those instances where CMYK printing is used, any suitable device, protocol, standard, and method may be used to facilitate the color printing. As used herein, "CMYK" may refer to four pigments used in color printing: "C" for a cyan pigment, "M" for a magenta pigment, "Y" for a yellow pigment, and "K" for a black pigment. An example of a printing device using CMYK printing is disclosed in Miller, U.S. Patent Publication Number 2015-0002567, published on Jan. 1, 2015, titled "Additive Color Printing" (U.S. patent application Ser. No. 13/927,551, filed on Jun. 26, 2013), which application is herein incorporated by reference and referred to hereafter as the "Color Printing" application. In some embodiments, printing system 100 can include one or more features of the systems, components, devices, and methods disclosed in the Color Printing application to facilitate color printing. For example, printing device 102 may be configured to print an image by dispensing droplets of a print material including one or more pigments onto a base. As used herein, droplets may refer to any suitable volume of print material, For example, a droplet may be one milliliter of print material. In other embodiments, printing system 100 may use other systems, components, devices, and methods.

Figure 3:
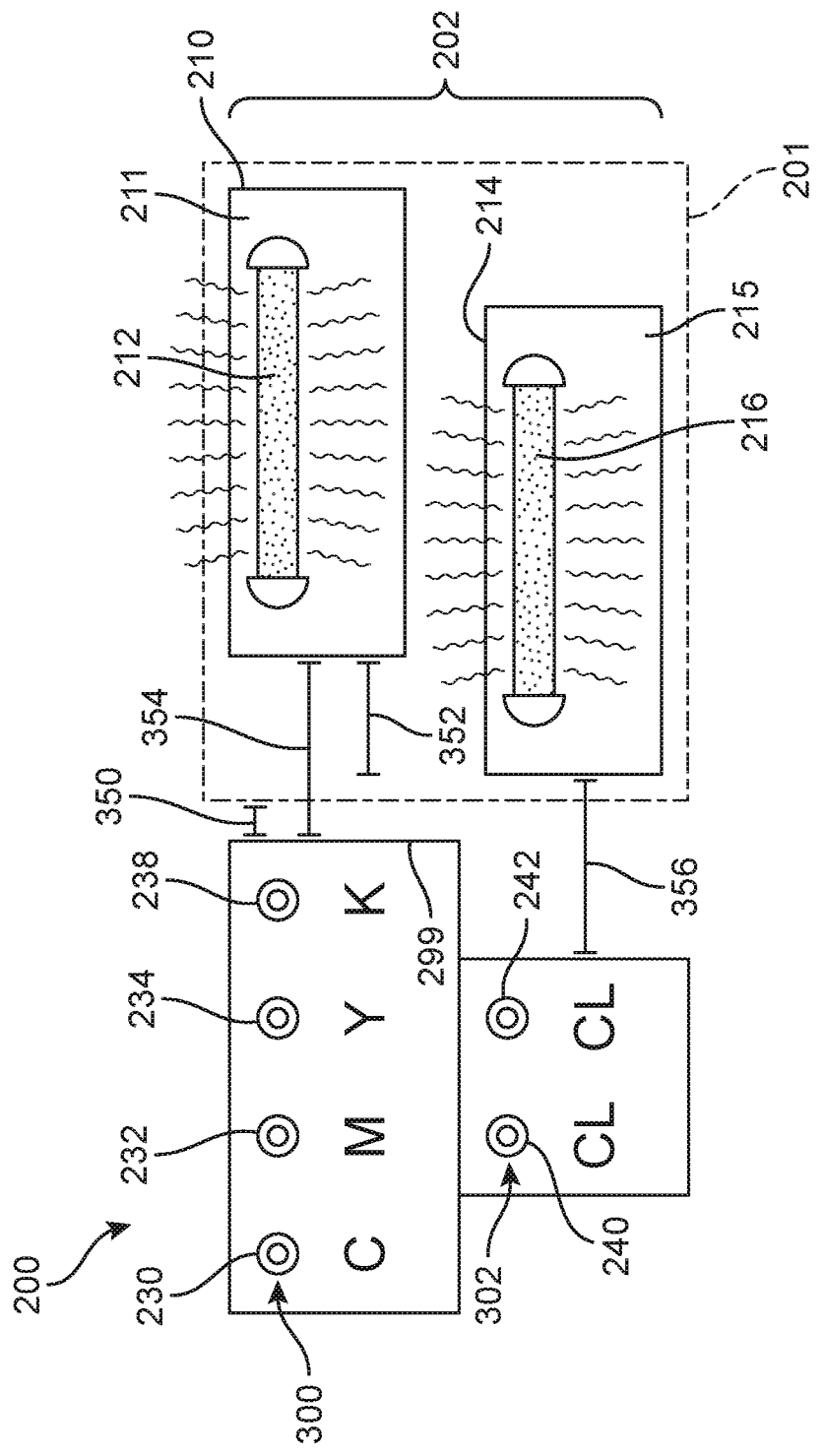
FIG. 3 is a bottom schematic view of an embodiment of some components of the printing system of FIG. 1.

In those instances where CMYK printing is used, CMYK may produce or approximate any color in the visible spectrum by printing and intermixing various combinations of pigments. Referring to FIGS. 2 and 3, printhead assembly 200 includes separate ink cartridges for cyan (C), magenta (M), and yellow (Y). Thus printhead assembly 200 can dispense inks or other colored print materials for the colors cyan (dispensed by nozzle 230), magenta (dispensed by nozzle 232), and yellow (dispensed by nozzle 234). Combinations of the dispensed colored materials may be intermixed to produce one or more colors of red, green, and blue. Further intermixing of colored print materials may be used to produce many more colors beyond red, green, blue, cyan, magenta, and yellow. In the exemplary embodiment, printhead assembly 200 may further include a separate cartridge for dispensing black ink or black print material (K), which may be dispensed by nozzle 238. In some embodiments, printing device 102 may include a white cartridge (not shown). While one cartridge for each print material is depicted in FIG. 2, consistent with some embodiments, printing device 102 may contain more than one cartridge for one or more of the print materials of the printhead assembly 200.

In those instances where CMYK printing is used, any suitable print material may be used to facilitate color printing. In some embodiments, CMYK print materials may be water based. In other embodiments, CMYK print materials may be oil based. In some embodiments, CMYK print material may include a structural print material.

Some embodiments may also use a structural print material, whose purpose is to provide 3D structure rather than color. In some embodiments, CMYK print materials may include a clear and/or transparent structure print material. In some embodiments, CMYK print materials may include an opaque structure print material. In some embodiments, the CMYK print material may include a translucent structure print material. In other embodiments, the structural material may have a combination of transparent structural material and/or translucent structural material.

Referring to FIGS. 2 and 3, printhead assembly 200 includes two cartridges that dispense a clear structural print material (CL), which are dispensed by nozzle 240 and nozzle 242 (not visible in FIG. 2). Although the exemplary embodiments may use clear structural print materials, other embodiments could include structural print materials with pigments.

Embodiments may include provisions for curing one or more kinds of print materials. Generally, any known methods and/or devices for curing printable substances could be used. Some embodiments may use ultraviolet (UV) curing lamps. As shown in FIGS. 2 and 3, printing system 100 includes curing device assembly 202. Curing device assembly 202 may further be comprised of first curing device 210 and second curing device 214. First curing device 210 includes first housing 211 and second UV emitting source 212 (e.g., a bulb), while second curing device 214 includes second housing 215 and second UV emitting source 216 (e.g., a bulb). As discussed in further detail below, curing device assembly 202, including both first curing device 210 and second curing device 214, may be configured to pass over recently ejected print material (such as inks or structural printing materials) to fully or partially cure the print material.

Embodiments using one or more UV lamps can utilize any type of UV lamps. Exemplary lamps that could be used with the embodiments include, but are not limited to, mercury vapor lamps (including H type, D type, or V type mercury lamps), fluorescent lamps, and/or UV LED devices. The type of lamps used may vary according to the type of print material, the type of printing application, the type of print device used, as well as other manufacturing considerations including cost and availability.

In the embodiments of FIGS. 1-2, curing device assembly 202 is configured with individual curing devices, or lamps, mounted within common housing 201 (see FIG. 2). With this arrangement, common housing 201 can be moved by an actuating device so that first curing device 210 and second curing device 214 are moved simultaneously. However, it is contemplated that in other embodiments, first curing device 210 and second curing device 214 could be separated rather than assembled within a common housing. In some cases, therefore, first curing device 210 and second curing device 214 could be independently actuated. For purposes of clarity, common housing 201 may not be illustrated in all Figures; for example, an outer housing for individual curing devices is not illustrated in FIGS. 9-17.

FIG. 3 illustrates the compact design of printhead assembly 200, which includes nozzles (and corresponding cartridges with print material) arranged in two adjacent rows. Printhead assembly 200 includes first row 300, comprising nozzle 230, nozzle 232, nozzle 234, and nozzle 238 (i.e., nozzles for dispensing colored inks) and second row 302, comprising nozzle 240 and nozzle 242 (i.e., the nozzles for dispensing structural print material). In some cases, first row 300 may be characterized as a first printhead of printhead assembly 200 while second row 302 may be characterized as a second printhead of printhead assembly 200. This compact arrangement allows for a compact length of a printhead assembly, where the length is a dimension extending along a longitudinal axis of the printhead assembly (e.g., longitudinal axis 213 in FIG. 2). This arrangement may allow for increased range for each nozzle in the printhead assembly since the nozzles have similar longitudinal positions.

Figure 18:
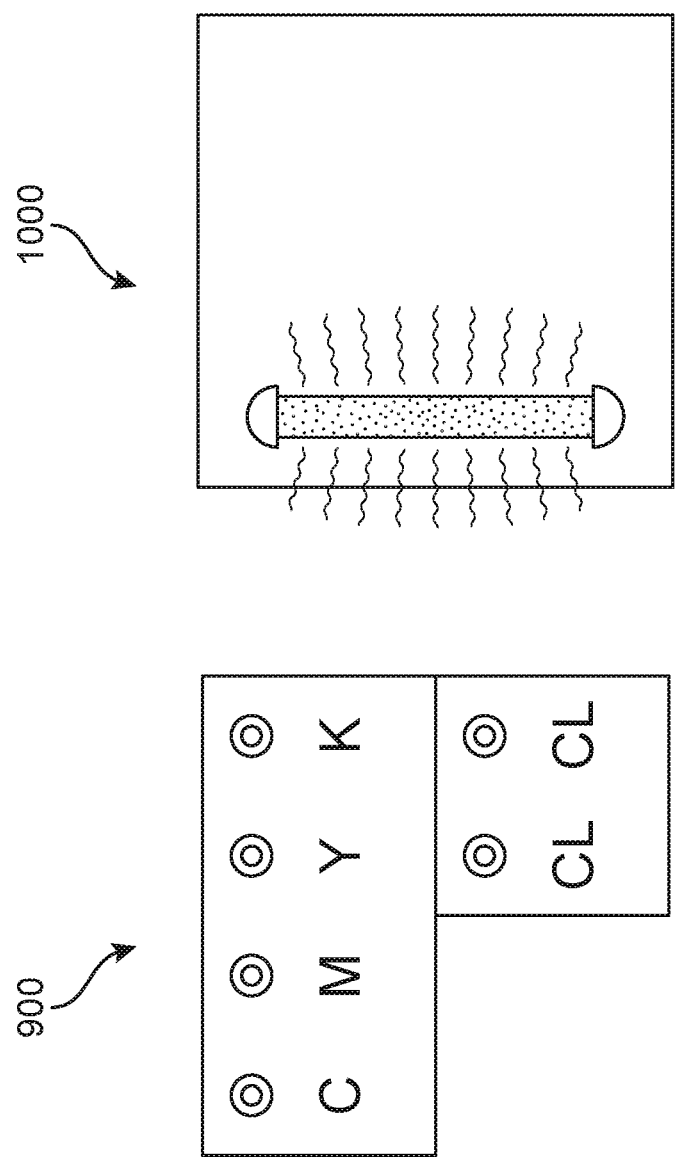
FIG. 18 is a schematic bottom view of an embodiment with a printhead assembly and a curing device including a single bulb oriented to cure print material from two adjacent rows of nozzles, according to an embodiment.
Figure 19:
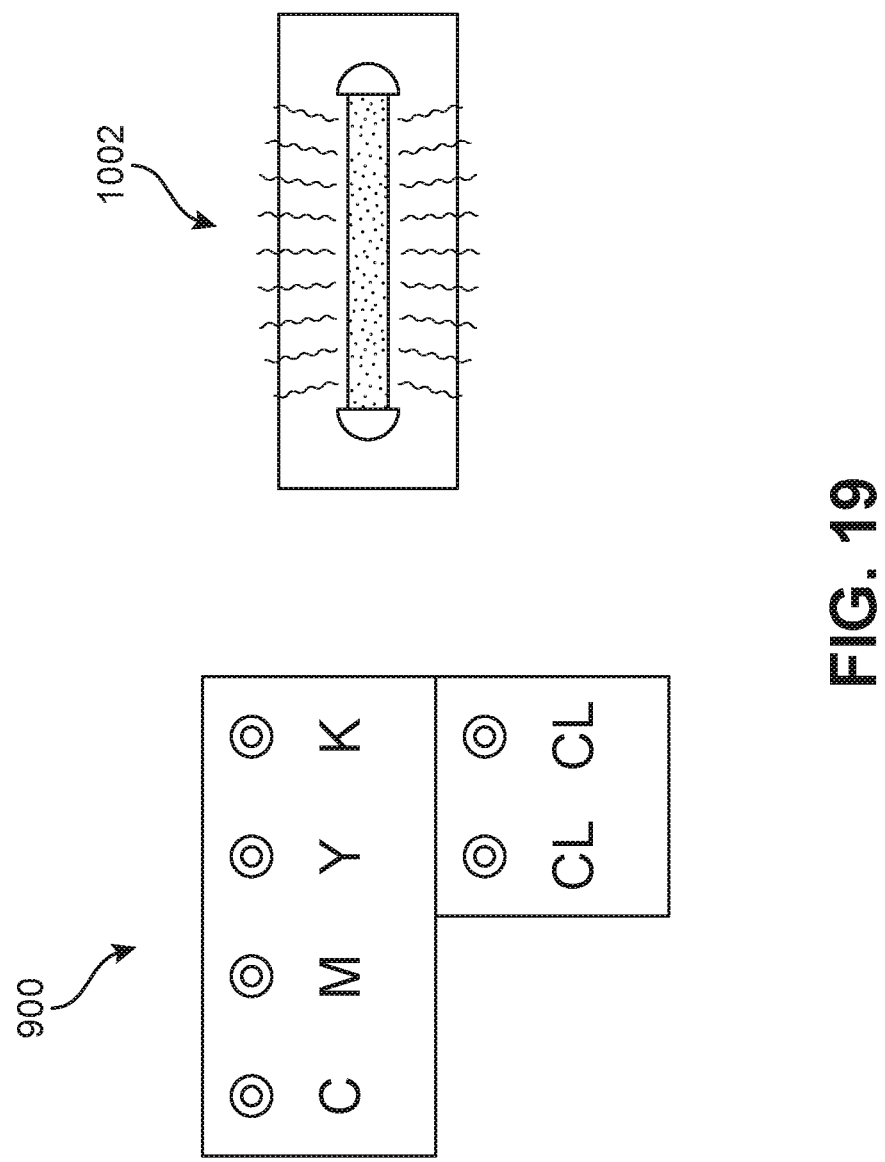
FIG. 19 is a schematic bottom view of an embodiment with a printhead assembly and a curing device including a single bulb positioned between two adjacent rows of nozzles in order to cure print material from the two adjacent rows of nozzles, according to an embodiment.

As seen in FIG. 3, each row of nozzles of print assembly 200 may be aligned with a corresponding curing device. For example, the nozzles of first row 300 are aligned with first curing device 210 and second row 302 is aligned with second curing device 214. Therefore, each curing device may be configured to cure ink deposited by a corresponding row of nozzles. Of course, in other embodiments, a single curing device (e.g., a single UV lamp) could be used to cure print material ejected from both rows simultaneously. Such configurations are shown in FIGS. 18-19 and discussed in further detail below.

In FIG. 3, each curing device is seen to be spaced apart from a corresponding row of nozzles in printhead assembly 200. In the configuration of FIG. 3, first curing device 210 and second curing device 214 may be spaced apart by approximately similar distances from the closest nozzle (within each corresponding row) of printhead assembly 200. As discussed in further detail below, the spacing between a curing device and one or more print nozzles may affect the gloss level achieved in a printed layer of material. Therefore, by using a similar spacing between the closest nozzles in each row, the gloss levels of the materials printed by nozzles in each row may be similar (assuming the print materials in the two different rows cure in a similar manner).

In the embodiment of FIG. 3, the placement of first curing device 210 and second curing device 214 within common housing 201 means that the spacing between each curing device and an associated row of nozzles is set according to the overall spacing between common housing 201 and a fixed reference point of printhead assembly 200 (e.g., spacing 350 between common housing 201 and rearward edge 299 of printhead assembly 200 in FIG. 3). Moreover, it may be seen that the relative positions of first curing device 210 and second curing device 214 within common housing 201 are offset by offset spacing 352, so that each curing device is approximately a similar distance from the closest nozzle of its corresponding row. In other words, first curing distance 354 between first curing device 210 and nozzle 238 is similar to second curing distance 356 between second curing device 214 and nozzle 242. As spacing 350 is adjusted in different printing configurations, absolute values of first curing distance 354 and second curing distance 356 may change, but may remain approximately equal, to ensure that both colored inks (or other colored print materials) are cured in a similar manner as clear structural print materials. Specifically, this allows for printable features to be formed that have common gloss levels for colored layers and clear structural layers, as discussed in further detail below.

Printable features (e.g., a single layer of ink on a paper) or a printed three-dimensional structure (e.g., a printed object comprised of multiple printed layers) may be seen to have an outermost printed surface with a particular finish. The finish may further have an associated "gloss level" (or "sheen level") that characterizes the visual appearance of the outer surface with respect to how light reflects off of the surface. For example, a surface with a matte gloss level (or matte finish) may appear dull or "flat" as the light diffuses from the surface at many different angles, while a surface with a glossy gloss level (or glossy finish) may appear shiny as light is reflected along a common (mirror-like) direction. A range of different gloss levels for surfaces are known in the art and an example of such a range includes flat, matte, eggshell, satin, silk, semigloss, and high gloss.

In some print materials that are UV cured, one or more curing parameters could affect the type of gloss level achieved in the final printed surface (i.e., the gloss level of a single layer of ink or of the outermost layer of a 3D printed structure). Examples of different curing parameters include, but are not limited to, the time delay between when the print material is dispensed on a surface and when the print material is cured, the intensity of the UV light used for curing, the speed (or velocity) of the curing lamp as it is moved over the print material, the vertical distance between the UV device and the print material surface as well as possibly other factors.

FIGS. 4 and 5 illustrate schematic views of a process of printing and curing a print material with printing device 102 (see FIG. 1), in which the relationship of the horizontal spacing between printhead assembly 200 and curing device assembly 202 and the time delay between when the print material is dispensed and when the print material is cured is clearly illustrated. For purposes of clarity, the following description discusses the row of nozzles with colored ink and the corresponding curing device, but similar principles may also be understood to apply between nozzles in the row of nozzles emitting structural print material and a second associated curing device. In FIG. 4, printhead assembly 200 is disposed over first portion 402 of a single layer of print material 400, while curing device assembly 202 is disposed over an adjacent second portion 404 of the single layer of print material 400. With curing device assembly 202 directly over second portion 404, second portion 404 of print material 400 has been cured (as indicated in FIGS. 4 and 5 using stippling). As seen in FIG. 4, printhead assembly 200 is spaced apart from curing device assembly 202 by distance 420 in a horizontal direction (i.e., a rearward edge of printhead assembly 200 is spaced apart from a forward edge of curing device assembly 202).

In FIG. 5, printhead assembly 200 and curing device assembly 202 have translated in direction 430 along rails 206 so that printhead assembly 200 has moved ahead of first portion 402, and curing device assembly 202 is disposed directly over first portion 402. With curing device assembly 202 directly over first portion 402, first portion 402 has now also been cured.

The elapsed time between the different positions of printhead assembly 200 and curing device assembly 202 in FIGS. 4 and 5 is indicated schematically using clock 440. Thus, time delay of 422, which is labeled on clock 440 in FIG. 5, occurs between the moment when first portion 402 of print material 400 is deposited onto underlying substrate 401 and when first portion 402 is cured by curing device assembly 202.

With FIGS. 4-5 in mind, it may be appreciated that in at least some cases, the horizontal spacing between a printhead assembly and a curing device may be in correspondence with the time delay between when the print material is ejected from the printhead assembly and when the curing device is located directly over the print material (and thus able to apply the greatest intensity of UV light to the underlying region of the print material). Moreover, since the time delay in curing a recently printed substance can affect its resulting gloss level, the gloss level of a print material may be seen to depend on the horizontal spacing between the printhead assembly and the curing device in a configuration such as is used in printing device 102.

Generally, increased delays between when a print material is deposited on a base and when it is cured may increase the gloss level. This is because longer delays in curing time allow more time for the print material (either color inks, clear inks or clear structural print materials) to flow and sheet, which results in a glossier finish.

Figure 6:
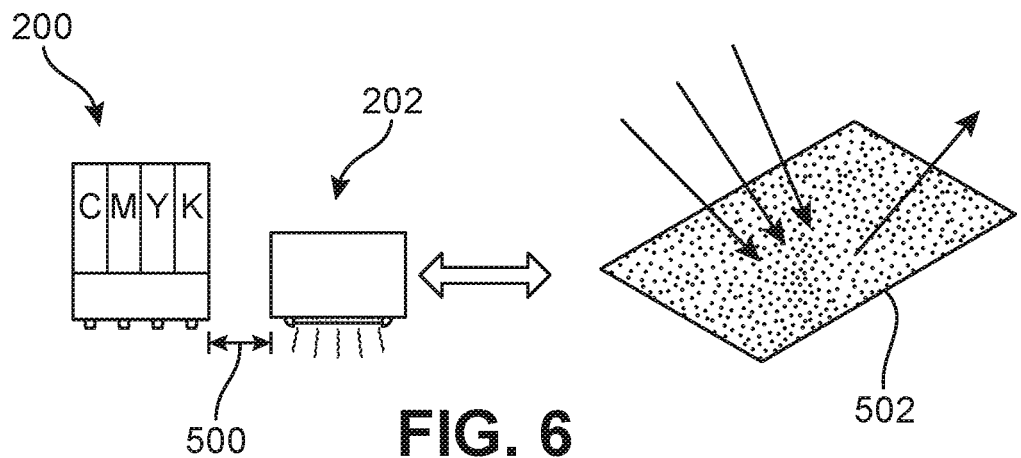
FIGS. 6-8 are schematic views illustrating the relationship between the spacing between a printhead assembly and a curing device and the resulting gloss level for a printable feature, according to an embodiment.
Figure 7:
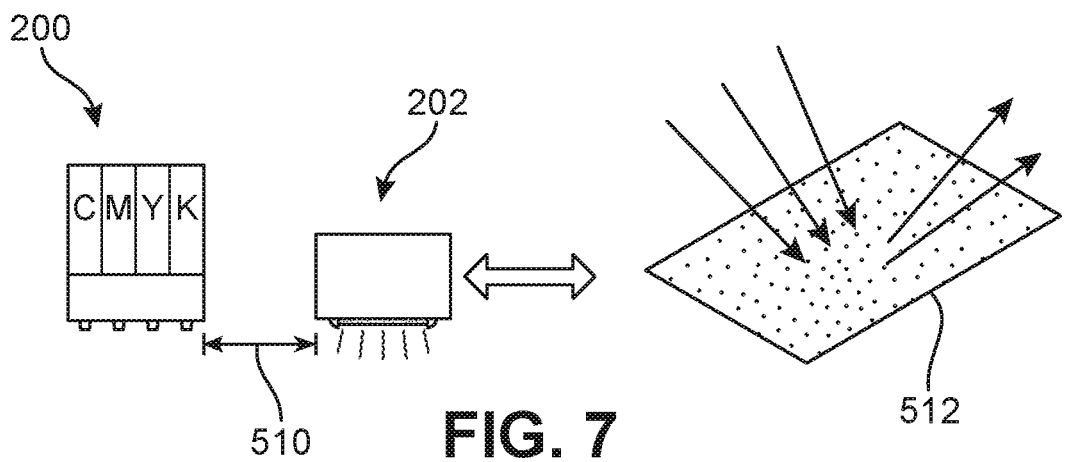
Figure 8:
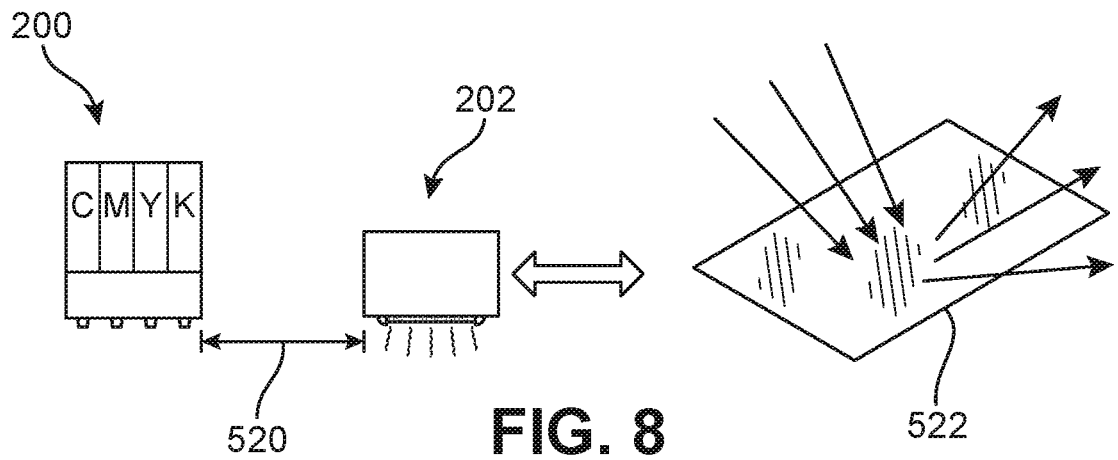

FIGS. 6-8 illustrate schematic views of different separation distances (between a printhead assembly and a curing device) and the gloss level produced by that separation distance. Of course, it may be appreciated that the gloss level of a printed surface could vary according to various other parameters, but for purposes of clarity it may be assumed that only the separation distance is changed from one configuration to the next. In the configuration shown in FIG. 6, printhead assembly 200 and curing device assembly 202 are spaced apart by first separation distance 500, which results in a matte gloss level for the surface of printable feature 502. In the configuration shown in FIG. 7, printhead assembly 200 and curing device assembly 202 are spaced apart by second separation distance 510, which results in a satin gloss level for the surface of printable feature 512. It may be seen by comparing FIGS. 6 and 7 that second separation distance 510 is greater than first separation distance 500, thereby resulting in the higher gloss for printable feature 512 as compared to printable feature 502. In the configuration shown in FIG. 8, printhead assembly 200 and curing device assembly 202 are spaced apart by third separation distance 520, which results in a high gloss level for the surface of printable feature 522. It may be seen by comparing FIGS. 7 and 8 that third separation distance 520 is greater than second separation distance 510, thereby resulting in the higher gloss for printable feature 522 as compared to printable feature 512. The progression of FIGS. 6-8 clearly demonstrates that in at least some embodiments, the gloss level of a cured print surface (i.e., the surface of a print material after curing) progresses from less glossy for relatively smaller separation distances to more glossy for relatively larger separation distances. Moreover, intermediate separation distances (e.g., distance 510) may result in intermediate gloss levels between matte and high gloss, such as a satin gloss level.

The exemplary separation distances discussed in FIGS. 6-8 are only intended to show the relative effect of increasing separation distances, and thus in these embodiments, the absolute values of the separation distances are not considered. It may be appreciated that the particular values of one or more separation distances may vary according to a variety of factors including the type of print material, the printhead and curing device velocity, the type of curing device used, as well as possibly other factors. Moreover, the embodiments depict three particular separation distances corresponding to three distinct gloss levels; however, it may be appreciated that other embodiments could vary the separation distance continually to produce a continuous range of gloss levels.

Throughout the detailed description and in the claims the terms "inward spacing" and "outward spacing" are used in a relative manner to describe a configuration where a curing device is disposed closer to, or further from, respectively, a printhead assembly (or row of nozzles in the printhead assembly). Thus, positioning a curing device disposed at an inward spacing relative to a printhead assembly may result in less glossy finishes for printed surfaces than when the curing device is disposed at an outward spacing relative to the printhead assembly.

Figure 9:
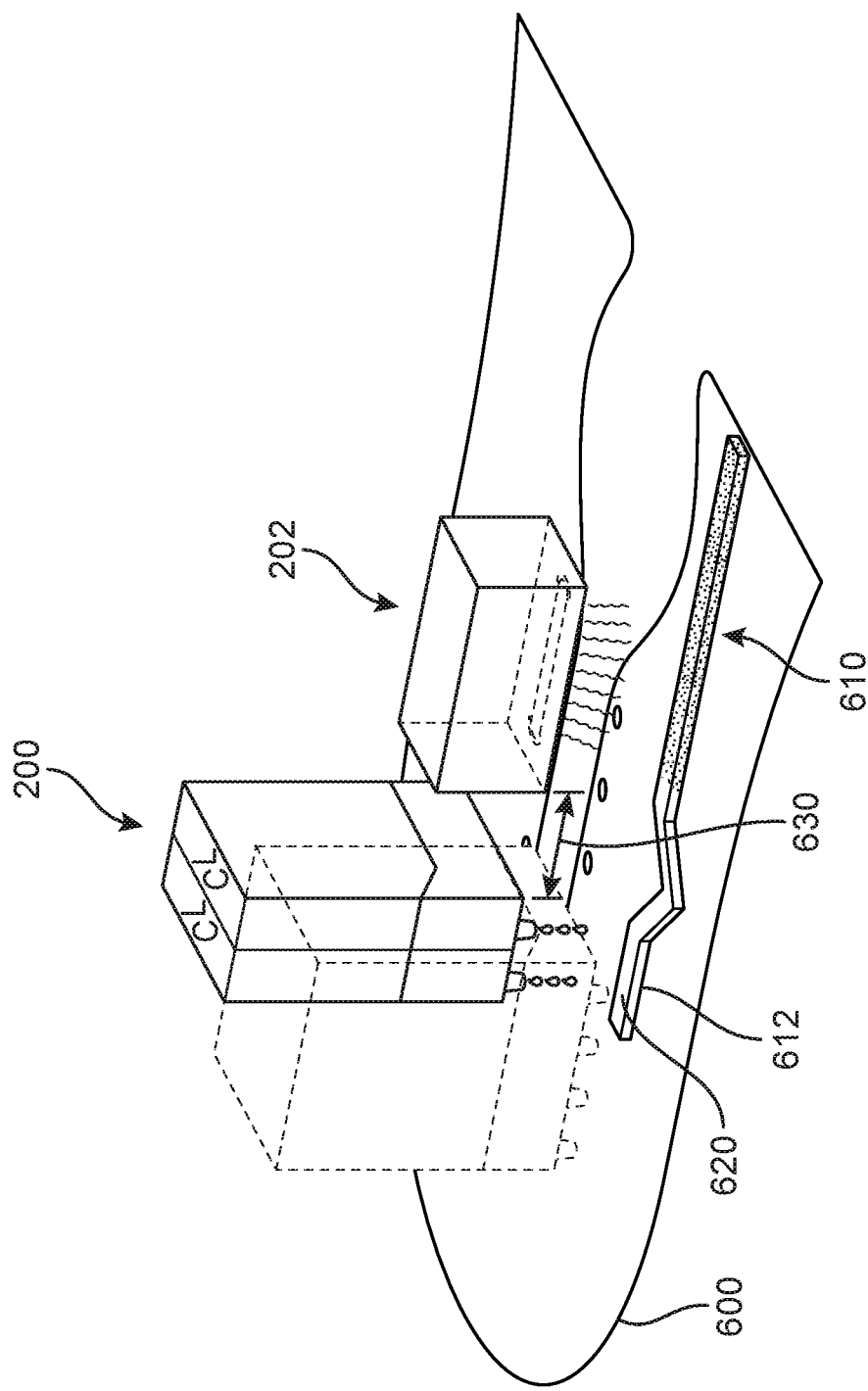
FIGS. 9-10 illustrate a schematic view of an operation of a printhead assembly and a curing assembly to achieve a matte finish for a printable feature on an article, according to an embodiment.
Figure 10:
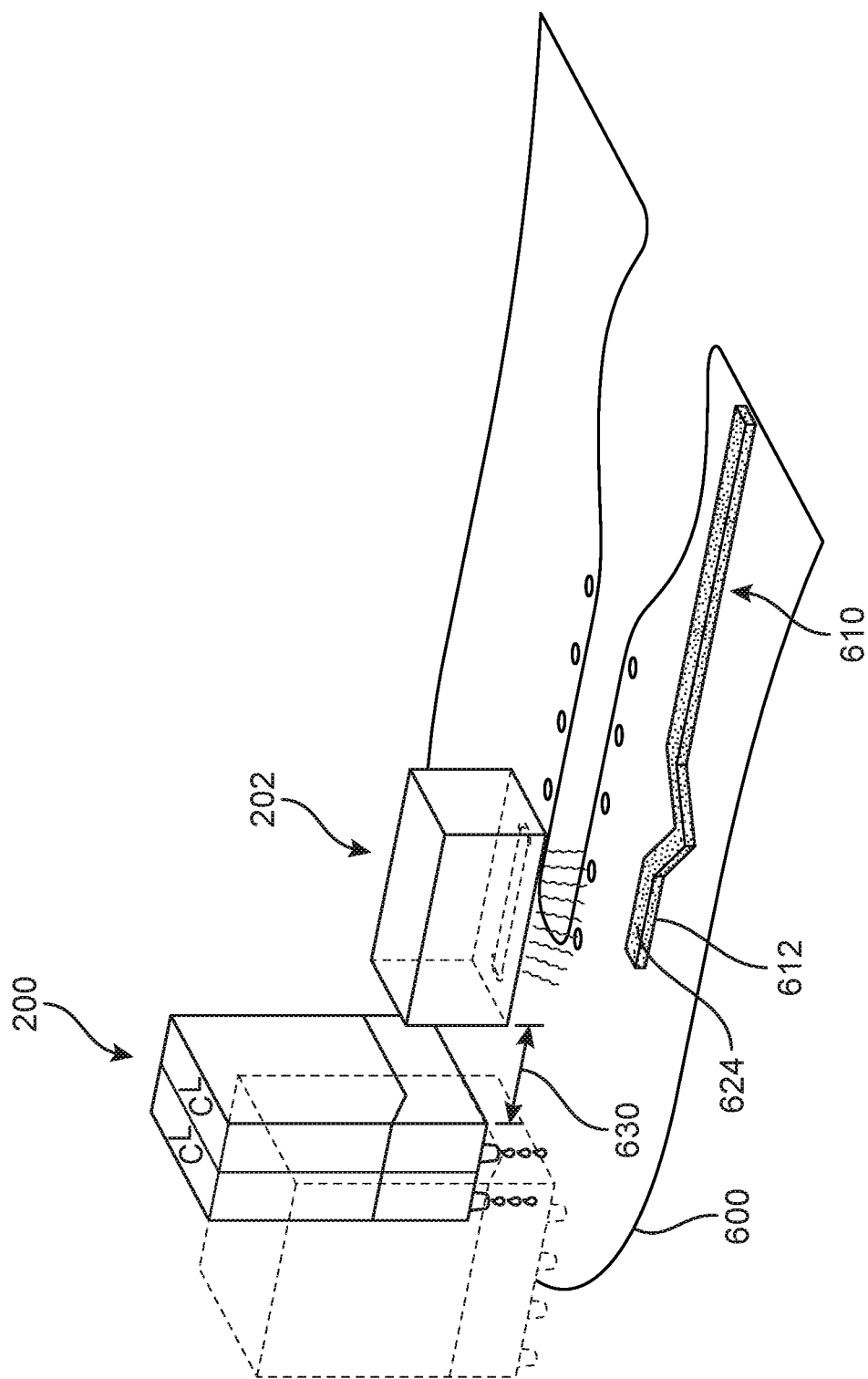
Figure 11:
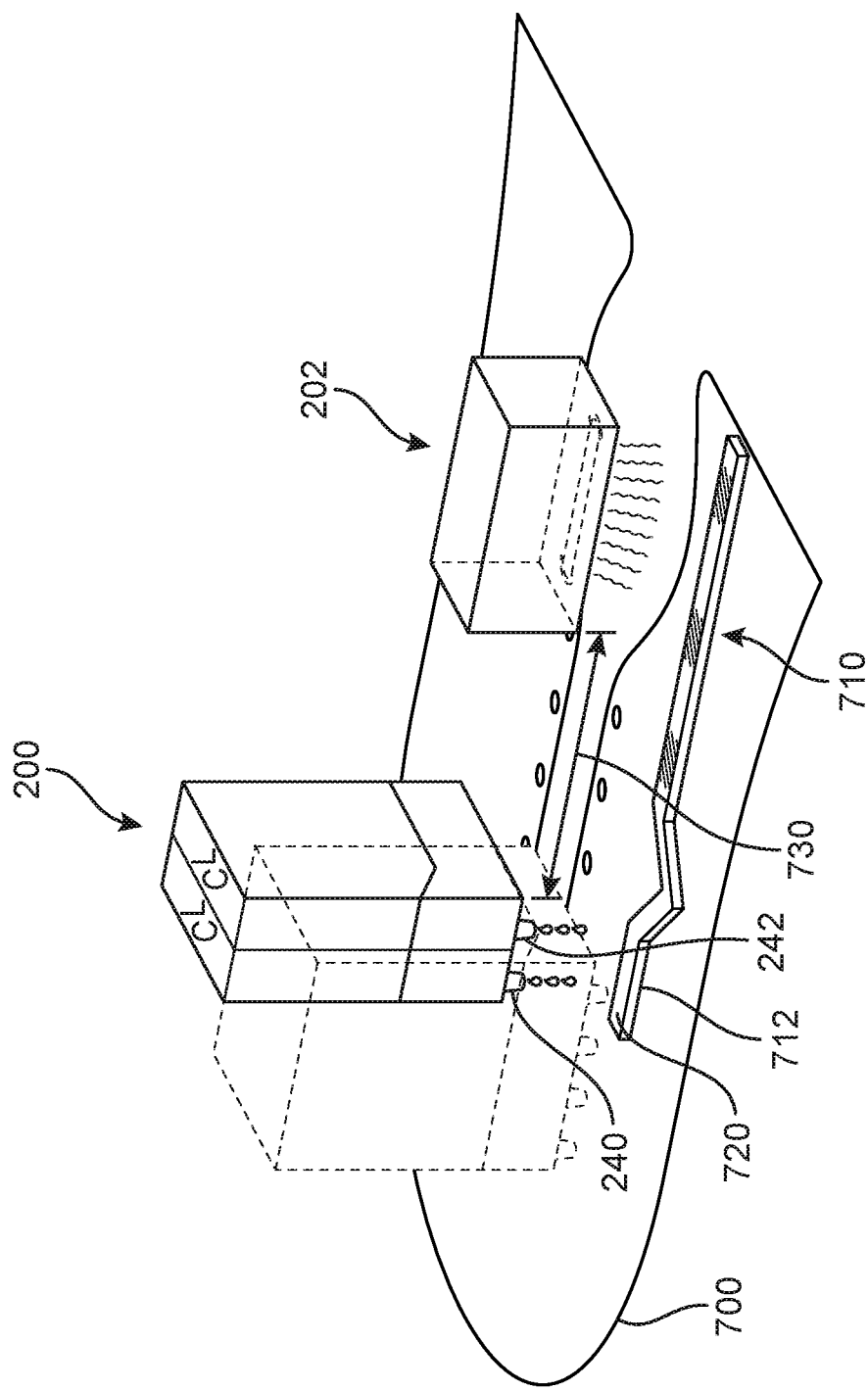
FIGS. 11-12 illustrate a schematic view of an operation of a printhead assembly and a curing assembly to achieve a high-gloss finish for a printable feature on an article, according to an embodiment.
Figure 12:
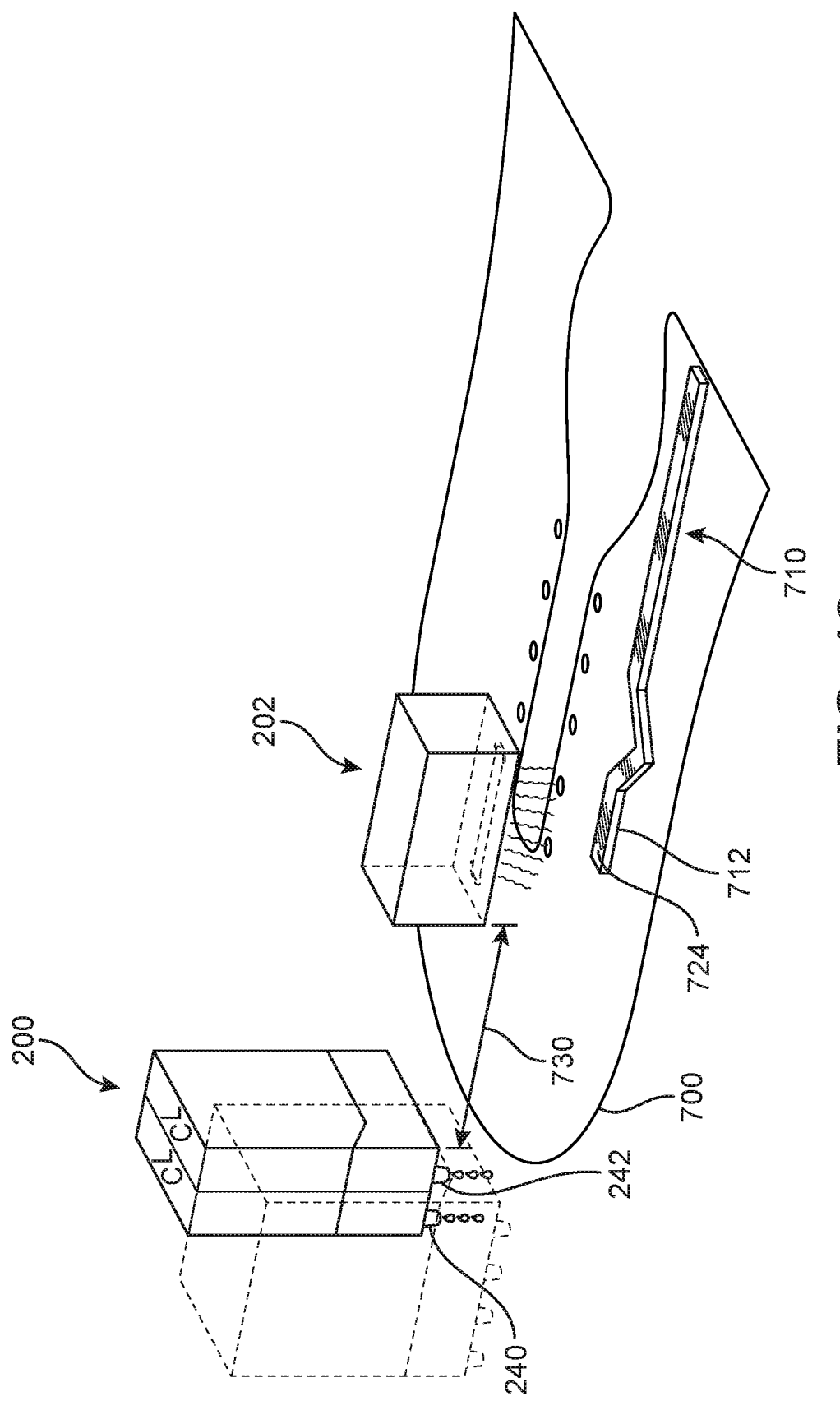

FIGS. 9-12 illustrate various modes of operation of a printing system in order to achieve two different kinds of gloss levels for a printable feature. Specifically, FIGS. 9-10 illustrate how a 3D printed structure is formed and cured to have a matte finish, while FIGS. 11-12 illustrate how a similar 3D printed structure may be formed and cured to have a high gloss finish.

Referring to FIGS. 9-10, printhead assembly 200 and curing device assembly 202 are positioned over a base or substrate in the form of upper 600 in order to form 3D printable feature 610 on the surface of upper 600. Initially, as seen in FIG. 9, printhead assembly 200 is positioned over portion 612 of 3D printable feature 610 and dispenses a final layer of print material from nozzle 242 (comprising a clear structural print material) to form uncured surface 620 of portion 612.

Next, in the configuration shown in FIG. 10, printhead assembly 200 and curing device assembly 202 have advanced along upper 600 while maintaining a constant separation distance 630 (also see FIG. 9). With curing device assembly 202 directly over portion 612, cured surface 624 for portion 612 is formed. In this case, the separation distance is selected to achieve a matte gloss level (or matte finish) for portion 612, which matches the gloss level of the previously printed and cured portions of printable feature 610.

Referring to FIGS. 11-12, printhead assembly 200 and curing device assembly 202 are positioned over a base or substrate in the form of upper 700 in order to form 3D printable feature 710 on the surface of upper 700. Initially, as seen in FIG. 11, printhead assembly 200 is positioned over portion 712 of 3D printable feature 710 and dispenses a final layer of print material from nozzle 242 (comprising a clear structural print material) to form uncured surface 720 of portion 712.

Next, in the configuration shown in FIG. 12, printhead assembly 200 and curing device assembly 202 have advanced along upper 700 while maintaining a constant separation distance 730 (also see FIG. 11). With curing device assembly 202 directly over portion 712, cured surface 724 for portion 712 is formed. In this case, the separation distance is selected to achieve a "high gloss" gloss level (or high gloss finish) for portion 712, which matches the gloss level of the previously printed and cured portions of printable feature 710.

Figure 13:
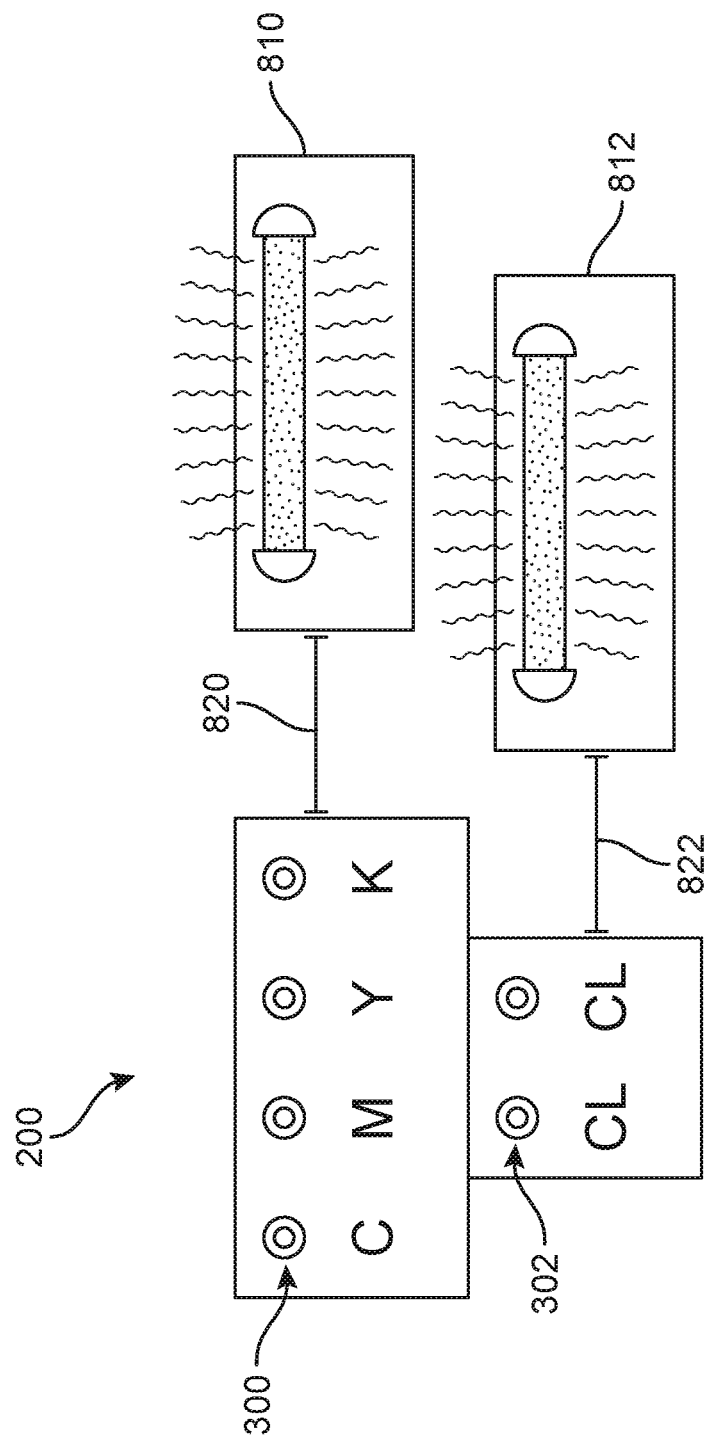
FIGS. 13-15 are schematic bottom views illustrating possible spacing for curing devices and a printhead assembly, according to an embodiment.
Figure 14:
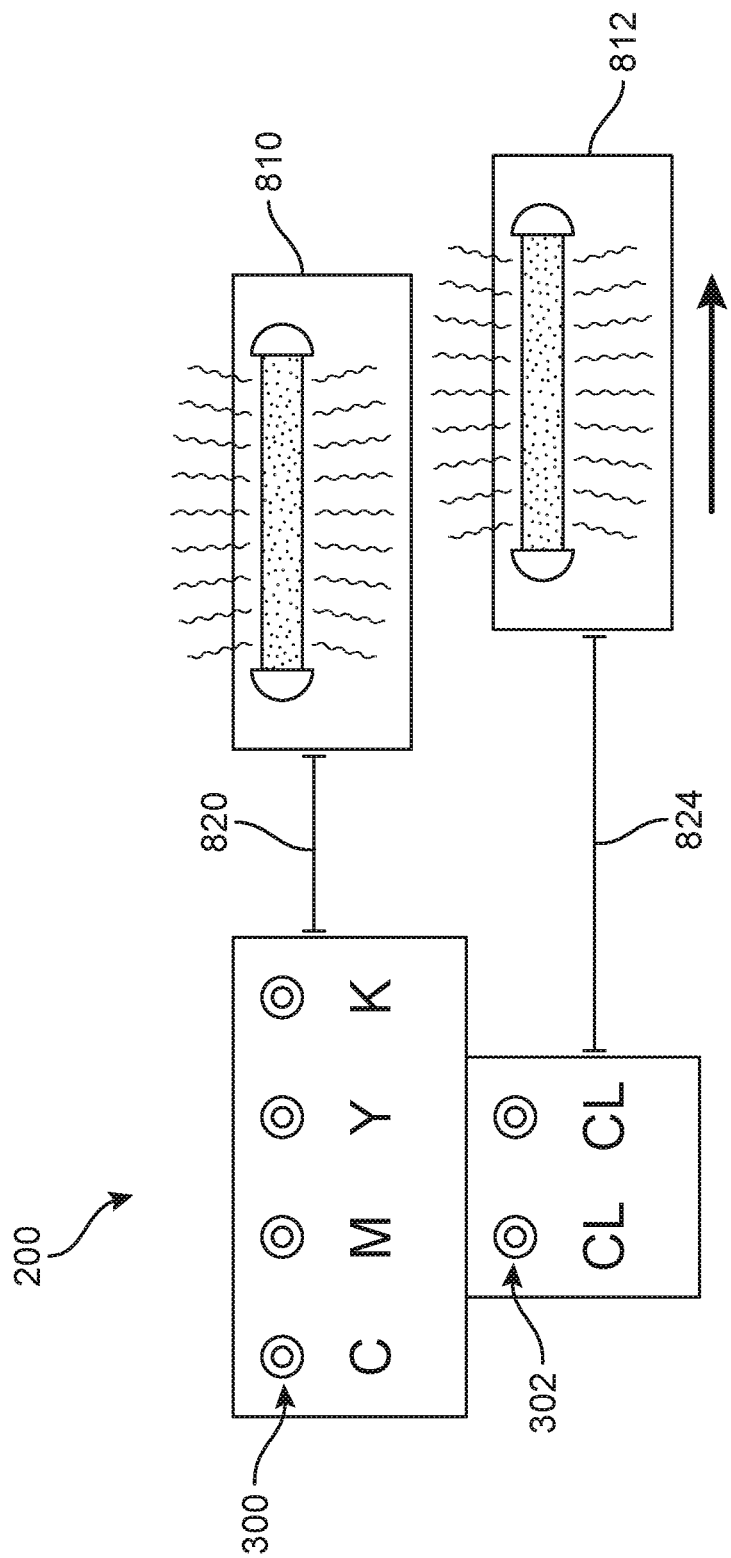
Figure 15:
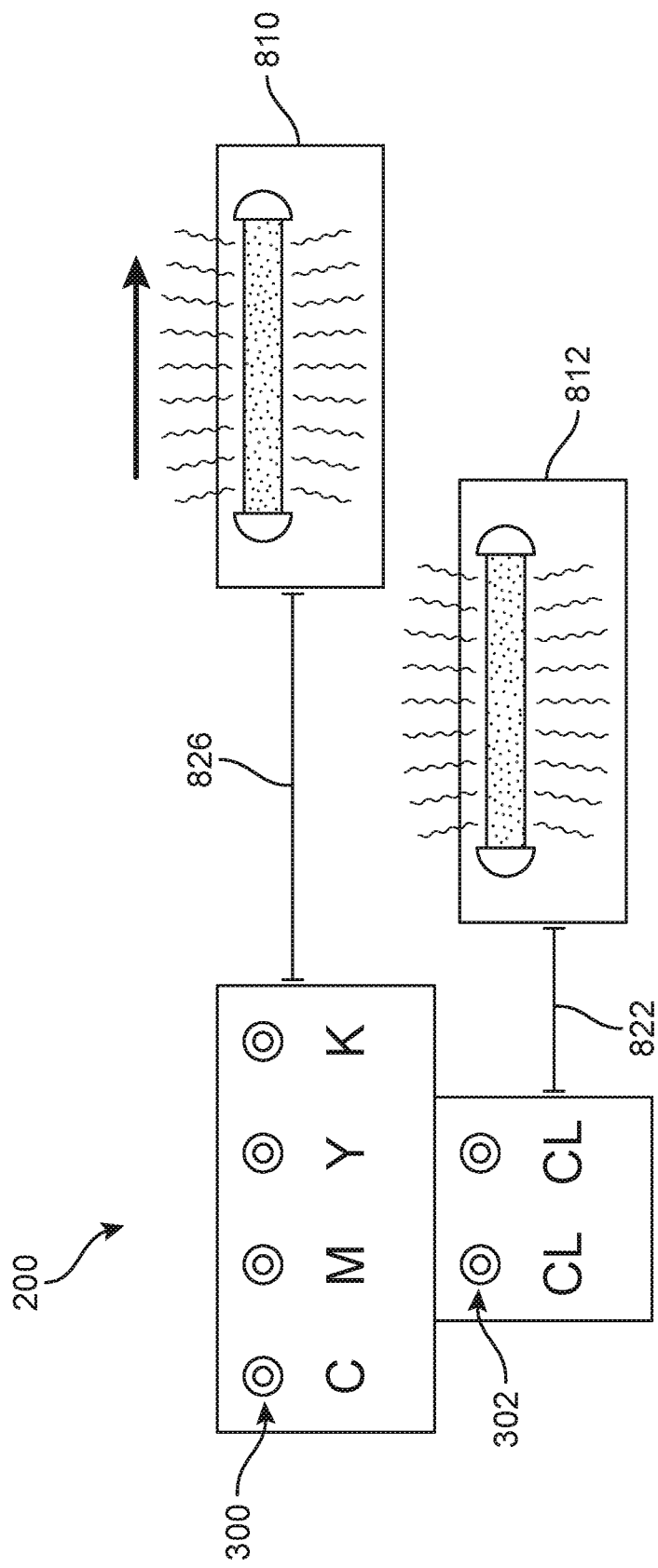

FIGS. 13-15 illustrate an embodiment where the separation distance between each curing device and a corresponding row of nozzles may be separately adjustable. In this case, first curing device 810 and second curing device 812 are positioned in FIG. 13 adjacent to the rows of printhead assembly 200. These curing devices may be contained within a common housing, or may be separately attached to the supporting apparatus of a printing device. For purposes of illustration, the embodiment is depicted without a common housing. In the configuration of FIG. 13, first curing device 810 is positioned at first separation distance 820 from the nozzles of first row 300 and second curing device 812 is positioned at a second separation distance 822 from the nozzles of second row 302. In this configuration, first separation distance 820 and second separation distance 822 may be approximately similar. However, FIG. 14 illustrates an operating configuration where second curing device 812 has been re-positioned to have third separation distance 824 from second row 302, which is significantly greater than first separation distance 820. In other words, second curing device 812 has been moved between an inward spacing in FIG. 13 and an outward spacing in FIG. 14. This may achieve a higher gloss for the print material dispensed from second row 302 compared to the print material dispensed from first row 300. In addition, FIG. 15 illustrates an operating configuration where first curing device 810 has been repositioned (relative to the configuration of FIG. 13) to have fourth separation distance 826 from first row 300, which is significantly greater than second separation distance 822. In other words, first curing device 810 has been moved between an inward spacing in FIG. 13 and an outward spacing in FIG. 15. This may achieve a higher gloss for the print material dispensed from first row 300 compared to the print material dispensed from second row 302.

The independent adjustment of each curing device so that each curing device may have a different separation distance from its corresponding row of print nozzles relative to the separation distance of the other curing device can be achieved in various ways. In embodiments using a common housing, the position of each curing device within the housing could be separately adjusted from the position of the housing relative to the printhead assembly. Such adjustments could be automatic or manual. Alternatively, in embodiments where each curing device is separately associated (e.g., attached) to rails or tracks of an actuating system of a print device, the individual adjustment of each curing device may be accomplished by independently moving the selected curing device to varying positions along a rail or track.

Figure 16:
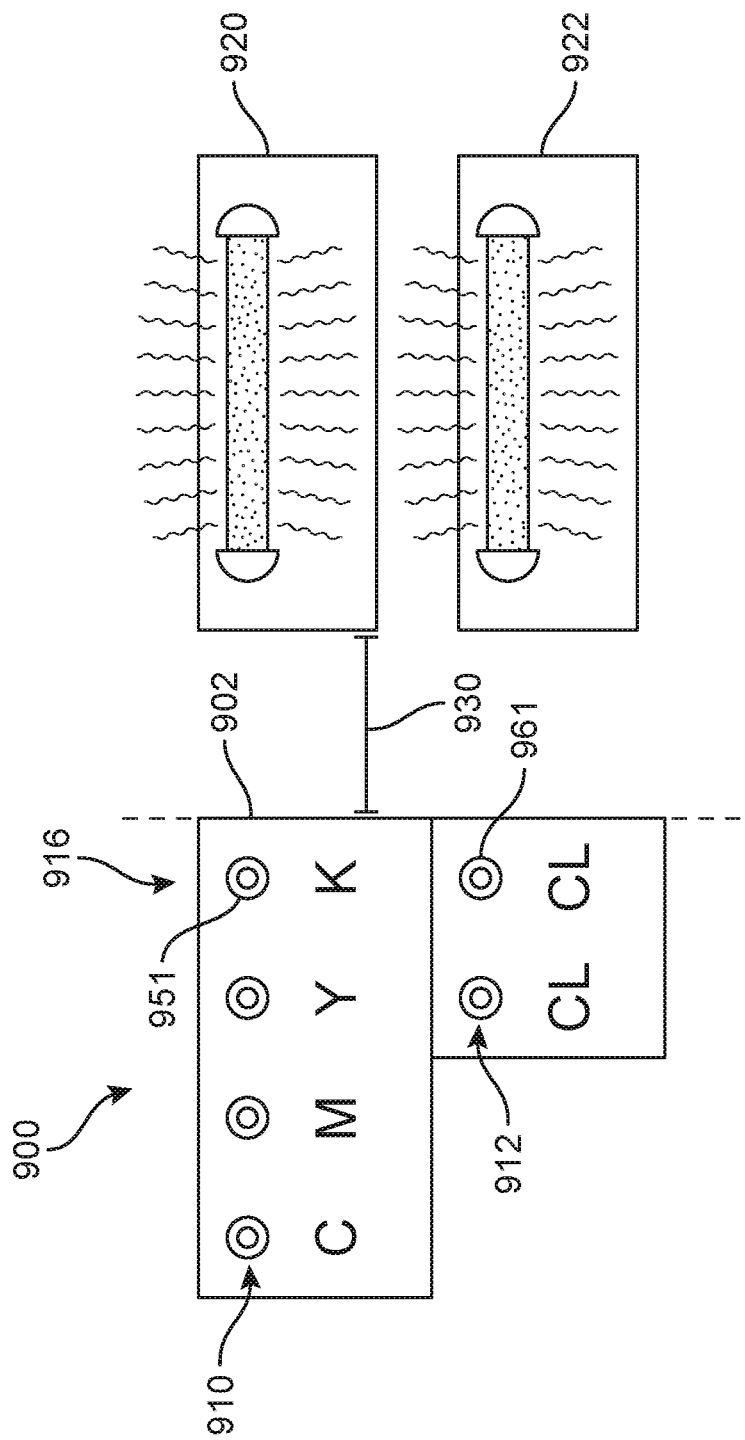
FIGS. 16-17 are schematic bottom views illustrating possible spacing for curing devices and a printhead assembly, according to an embodiment.
Figure 17:
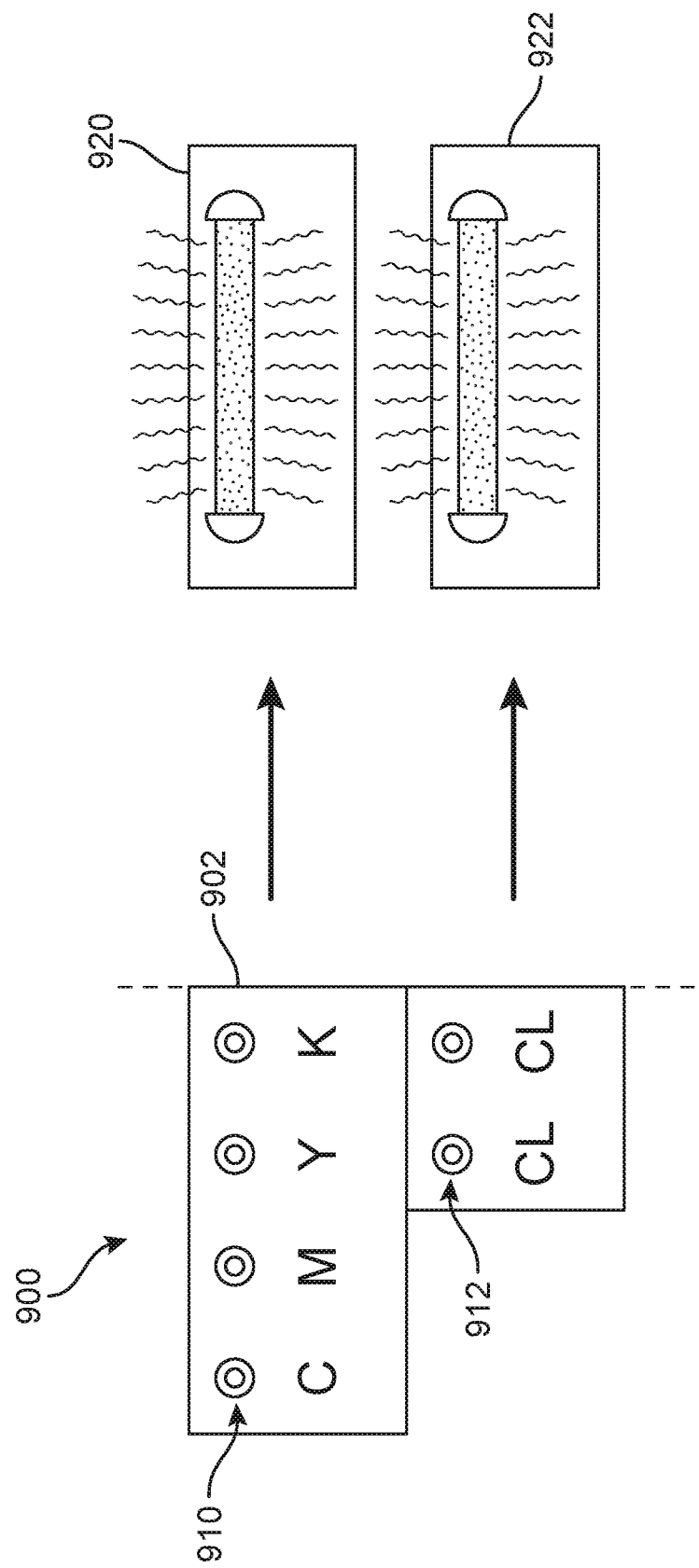

FIGS. 16-17 illustrate another embodiment in which nozzles in adjacent rows of a printhead assembly are aligned in a particular manner. Specifically, each row is aligned with a rearward most edge of the printhead assembly. Referring to FIGS. 16-17, printhead assembly 900 may have similar characteristics to printhead assembly 200 of previous embodiments. In contrast to printhead assembly 200, however, first row 910 of print nozzles and second row 912 of print nozzles are aligned so that their rearward most nozzles are adjacent rearward most edge 902 of printhead assembly 900. Specifically, rearward most nozzle 951 of first row 910 and rearward most nozzle 961 of second row 912 are aligned in first column 916, which is perpendicular to first row 910 and second row 912. This allows for a configuration in which curing devices corresponding to each row of nozzles may be set at a common spacing. For example, first curing device 920 and second curing device 922 are both set at common spacing 930 relative to rearward most edge 902 of printhead assembly 900. FIG. 17 illustrates how first curing device 920 and second curing device 922 may be translated together to change the common spacing. This removes the need for any offset in the relative positions of two adjacent curing devices. Such a configuration may allow for a more compact curing device assembly (e.g., a more compact housing). Furthermore, this arrangement allows for more control over the curing distance when compared to linear arrangements where the color and clear print nozzles are aligned in a single row. In such an alternative configuration, there may be some gloss affecting distance between the curing device and the nozzles of either the color inks or the clear inks (whichever are further from the curing device). The compact configuration of the present embodiments helps minimize any such gloss affecting distances since each group of nozzles is relatively close to a corresponding curing device.

It is contemplated that the "column-aligned" printhead assembly depicted in FIGS. 16-17 may also facilitate the use of a single curing device, or curing lamp. For example, FIG. 18 illustrates an embodiment where single UV curing lamp 1000 is oriented to overlap with both rows of print nozzles. FIG. 19 illustrates another embodiment where single UV curing lamp 1002 is positioned approximately "between" both rows of print nozzles (along a lateral or widthwise direction of the printhead assembly), which may allow single UV curing lamp 1002 to cure print material dispensed from either row of nozzles.

It may be appreciated that adjustment of the curing devices relative to the printhead assembly (i.e., the relative spacing between these components) can be adjusted manually in some embodiments and can be adjusted automatically in other embodiments. In automated embodiments, a controller or control unit of some kind may automatically determine a spacing between a printhead and a corresponding curing device according to information about a target gloss level for a predetermined portion of a printable feature. Moreover, in some embodiments, the actuating system described in the embodiment depicted in FIGS. 1-3 may be used to move each curing device to a specified position relative to the printhead assembly.

Figure 20:
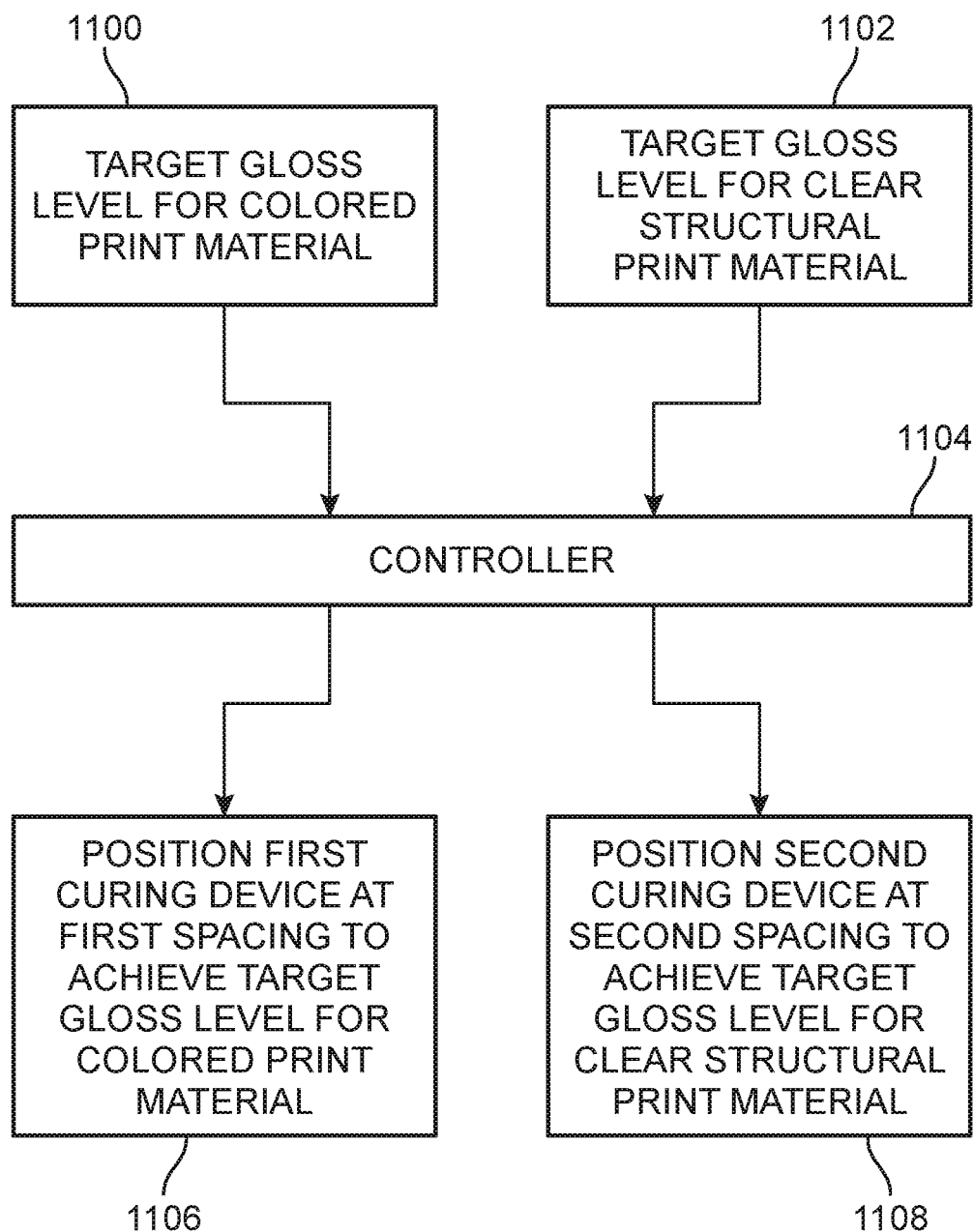
FIG. 20 is a schematic view of an embodiment of a process for controlling some components of a printing system.

FIG. 20 illustrates a schematic diagram that depicts how a controller may automatically determine and set the relative spacing for each curing device according to target gloss level information. Referring to FIG. 20, controller 1104 receives first input 1100 about a target gloss level for print material ejected from a first row/printhead (e.g., color print material in some cases) and receives a second input 1102 about a target gloss level for print material ejected from a second row/printhead (e.g., clear structural print material in some cases). The controller uses this information to automatically determine the relative spacing between a first curing device and the printhead assembly (output 1106) and also the relative spacing between a second curing device and the printhead assembly (output 1108). In some cases, the controller may send a command to an actuating system to automatically reposition the curing devices according to output 1106 and output 1108. In some cases, this adjustment could be done prior to starting a print run. Alternatively, in some other cases, a user could manually adjust the spacing between each print head and the corresponding curing device.

Figure 21:
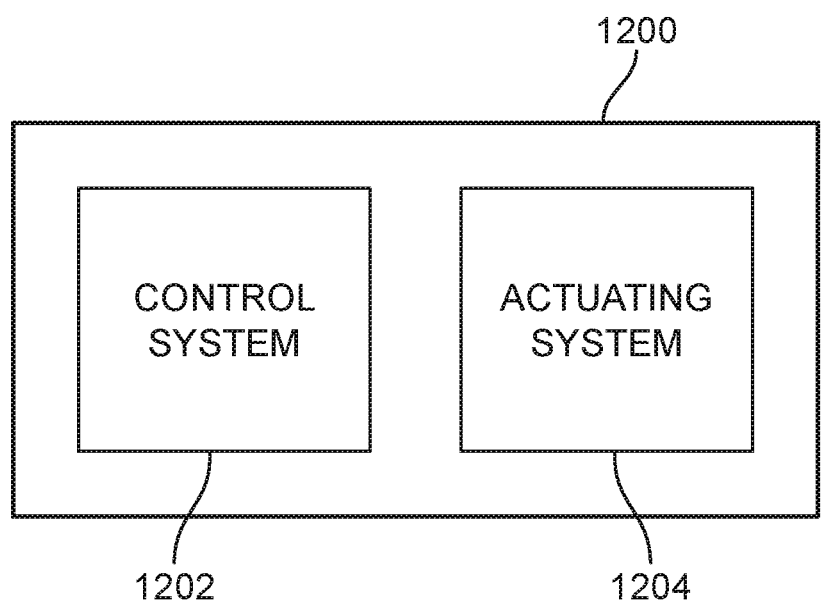
FIG. 21 is a schematic view of an embodiment of some components of a printing system.

FIG. 21 is a schematic view of an embodiment of some components of a printing system 1200. In some cases, printing system 1200 includes a control system 1202 (e.g., a controller, an electronic control unit, a software module or other control system). Control system 1202 may include various provisions for controlling the spacing between curing devices and printheads. Specifically, in some cases, control system 1202 can be used to control an actuating system 1204 for print heads and/or curing devices. In at least one embodiment, for example, control system 1202 may be used to automatically adjust the desired spacing between a first print head with color inks and a first curing device, as well as between a second print head with clear inks and a second curing device.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

What is claimed is:

1. An apparatus for printing a printable feature onto a base, the apparatus comprising:

a printing surface for receiving the base;

a printhead assembly comprising a first printhead and a second printhead, wherein the first printhead comprises a first row of print nozzles, wherein the second printhead comprises a second row of print nozzles, wherein the first row of print nozzles is disposed adjacent to and parallel with the second row of print nozzles, and wherein the printhead assembly is movable along a primary axis;

a curing device assembly comprising a first housing, a first curing device, a second housing, and a second curing device, wherein the first housing and the second housing are disposed on a first side of the printhead assembly, wherein the first curing device is disposed within the first housing, wherein the first housing is independently movable relative to the printhead assembly and the second housing, and wherein the second curing device is disposed within the second housing, wherein the first housing and the first curing device are movable relative to the first printhead, the second printhead, the second housing, and the second curing device along a first axis, wherein the first axis is parallel to the primary axis and the first row of print nozzles, wherein the second housing and the second curing device are movable relative to the first printhead, the first housing, the first curing device, and the second printhead along a second axis, and wherein the second axis is parallel to the primary axis, the first axis, and the second row of print nozzles;

an actuating system comprising a primary rail, a first rail, a second rail, a primary actuating device, a first actuating device, a second actuating device, and a controller, wherein the printhead assembly is mounted on the primary rail by the primary actuating device, wherein the first housing of the curing device assembly is mounted to the first rail by the first actuating device, wherein the second housing of the curing device assembly is mounted to the second rail by the second actuating device, wherein the controller is configured to independently control the primary actuating device, the first actuating device, and the second actuating device, wherein the primary actuating device is configured to move the printhead assembly along the primary axis and relative to an upper surface of the base, wherein the first actuating device is configured to independently move the first housing and the first curing device relative to the first printhead and the second curing device along the first axis in a range between a first inward spacing and a first outward spacing, and wherein the second actuating device is configured to independently move the second housing and the second curing device relative to the second printhead and the first curing device along the second axis in a range between a second inward spacing and a second outward spacing;

wherein the first printhead is configured to dispense a first print material in a liquid state while the actuating system moves the printhead assembly and the curing device assembly;

wherein the controller and the first actuating device are configured to automatically move the first curing device along the first axis to a first separation distance relative to the first printhead;

wherein the first curing device is configured to cure the first print material while the first curing device is at the first separation distance;

wherein the second printhead is configured to dispense a second print material while the actuating system moves the printhead assembly and the curing device assembly;

wherein the controller and the second actuating device are configured to automatically move the second curing device along the second axis to a second separation distance relative to the second printhead, the second separation distance being different than the first separation distance; and wherein the second curing device is configured to cure the second print material while the second curing device is at the second separation distance.

2. The apparatus for printing as in claim 1, wherein the first separation distance is greater than the second separation distance.

3. The apparatus for printing as in claim 1, wherein the first separation distance is less than the second separation distance.

4. The apparatus for printing as in claim 1, wherein the controller and the first actuating device are configured to automatically move the first curing device along the first axis from the first separation distance to a third separation distance relative to the first printhead; and
   wherein the controller and the first actuating device are configured to automatically move the second curing device along the second axis from the second separation distance to a fourth separation distance relative to the second printhead.

5. The apparatus for printing according to claim 1, wherein the first row of print nozzles are aligned with the second row of print nozzles to form a column of print nozzles that is perpendicular to each row of print nozzles.

6. The apparatus for printing according to claim 5, wherein a first nozzle in the first printhead and in the column of print nozzles is disposed closer to the first curing device than any remaining print nozzles in the first printhead; and
   wherein a second nozzle in the second printhead and in the column of print nozzles is disposed closer to the second curing device than any remaining print nozzles in the second printhead.

7. The apparatus for printing according to claim 1, wherein the first printhead comprises print nozzles configured to print colored print materials and wherein the second printhead comprises print nozzles configured to print clear print materials.

8. The apparatus for printing according to claim 1, wherein the printable feature is a three-dimensional structural component.

9. The apparatus for printing as in claim 1, wherein the first curing device is spaced closer to the first printhead with the first inward spacing than with the first outward spacing.

10. The apparatus for printing as in claim 9, wherein the second curing device is spaced closer to the second printhead with the second inward spacing than with the second outward spacing.

11. The apparatus for printing as in claim 10, wherein the first inward spacing corresponds with a matte finish for print material printed by the first printhead, and wherein the second inward spacing corresponds with the matte finish for print material printed by the second printhead; and
   wherein the first outward spacing corresponds with a glossy finish for print material printed by the first printhead, and wherein the second outward spacing corresponds with the glossy finish for print material printed by the second printhead.

12. The apparatus for printing as in claim 11, wherein spacing of the curing device assembly relative to the printhead assembly is configured to be adjusted automatically.

13. The apparatus for printing as in claim 12, wherein the controller automatically adjusts the spacing of the curing device assembly relative to the printhead assembly according to a target gloss level for a portion of the printable feature.

14. The apparatus for printing as in claim 1, wherein the base is an upper for an article of footwear.

15. An apparatus for printing a three-dimensional structural component onto a base, the apparatus comprising:
   a printing surface for receiving the base;
   a printhead assembly comprising a first printhead and a second printhead;
   the first printhead comprising a first row of print nozzles and the second printhead comprising a second row of print nozzles;
   the first row of print nozzles being disposed adjacent to and parallel with the second row of print nozzles;
   the first row of print nozzles being aligned with the second row of print nozzles to form a column of print nozzles that is perpendicular to each row of print nozzles;
   a curing device assembly disposed on a first side of the printhead assembly and comprising a first curing device aligned with the first printhead along a first axis and a second curing device aligned with the second printhead along a second axis;
   an actuating system comprising a primary rail, a first rail, a second rail, a primary actuating device, a first actuating device, a second actuating device, and a controller, wherein the primary rail, the first rail, and the second rail are spaced apart from each other and are parallel to each other, wherein the printhead assembly is coupled to the primary rail by the primary actuating device, wherein the first curing device is coupled to the first rail by the first actuating device, wherein the second curing device is coupled to the second rail by the second actuating device, wherein the controller is configured to independently control the primary actuating device, the first actuating device, and the second actuating device, wherein the primary actuating device is configured to automatically and independently move the printhead assembly relative to the primary rail and relative to the printing surface and the base, wherein the first actuating device is configured to automatically and independently move the first curing device relative to the first rail and along the first axis to a first separation distance relative to the first printhead and the second curing device, and wherein the second actuating device is configured to automatically and independently move the second curing device relative to the second rail and along the second axis to a second separation distance relative to the second printhead and the first curing device, the second separation distance being different than the first separation distance;
   wherein the first printhead is configured to dispense a first print material onto the base, wherein the first curing device is configured to cure the first print material, and wherein the controller is configured to move the first curing device to the first separation distance; and
   wherein the second printhead is configured to dispense a second print material onto the base, wherein the second curing device is configured to cure the second print material, and wherein the controller is configured to move the second curing device to the second separation distance.

16. The apparatus for printing as in claim 15, wherein the controller and the first actuating device are further configured to position the first curing device relative to the first printhead to at least a first inward spacing and a first outward spacing along the first axis, the first separation distance being disposed between the first inward spacing and the first outward spacing;
   wherein the controller and the second actuating device are further configured to position the second curing device relative to the second printhead to at least a second inward spacing and a second outward spacing along the second axis, the second separation distance being disposed between the second inward spacing and the second outward spacing; and wherein the first curing device is spaced closer to the first printhead with the first inward spacing than with the first outward spacing, and wherein the second curing device is spaced closer to the second printhead with the second inward spacing than with the second outward spacing.

17. The apparatus for printing as in claim 16, wherein the first and second inward spacing corresponds with a matte finish, and wherein the first and second outward spacing corresponds with a glossy finish.

18. The apparatus for printing as in claim 17,
wherein the controller is configured to receive a first target gloss level for printing the three-dimensional structural component using the first print material from the first printhead and to receive a second target gloss level for printing the three-dimensional structural component using the second print material from the second printhead;
wherein the controller selects the first separation distance based on the first target gloss level; and
wherein the controller selects the second separation distance based on the second target gloss level.

19. The apparatus for printing as in claim 18, wherein the controller selects an intermediate spacing between the first inward spacing and the first outward spacing for the first printhead when the first target gloss level indicates an intermediate target gloss level between the glossy finish and the matte finish.

20. The apparatus for printing as in claim 15, wherein the first print material comprises one or more pigments and wherein the second print material is clear.

21. A method of printing a three-dimensional structural component with a printhead assembly having a first printhead and a second printhead, comprising:
printing a first print material from the first printhead onto a base;
printing a second structural print material from the second printhead onto the base;
wherein the first printhead comprises a first row of print nozzles of the printhead assembly and wherein the second printhead comprises a second row of print nozzles of the printhead assembly, the second row of print nozzles being parallel with the first row of print nozzles;
receiving a first target gloss level for printing the first print material from the first printhead;
selecting a first spacing between a first curing device of a curing device assembly and the first printhead according to the first target gloss level, wherein the curing device assembly is disposed on a first side of the print assembly, and wherein the first curing device is mounted on a first rail and is movable relative to the first rail and relative to the first printhead along a first axis to the first spacing;
automatically adjusting the first curing device relative to the first rail and relative to the first printhead along the first axis to the first spacing;
receiving a second target gloss level for printing the second structural print material from the second printhead;
selecting a second spacing between a second curing device of the curing device assembly and the second printhead according to the second target gloss level, wherein the second curing device is mounted on a second rail and is movable relative to the second rail and relative to the second printhead along a second axis to the second spacing, the second spacing being independently selectable relative to and different than the first spacing;
automatically adjusting the second curing device relative to the second rail and relative to the second printhead along the second axis to the second spacing; and
curing the first print material and the second structural print material using the curing device assembly.

22. The method of printing as in claim 21, further comprising an actuating system with a controller, a first actuating device, and a second actuating device, wherein the controller and the first actuating device are configured for automatically adjusting the first curing device relative to the first rail along the first axis to the first spacing and wherein the controller and the second actuating device are configured for automatically adjusting the second curing device relative to the second rail along the second axis to the second spacing.

23. The method of printing as in claim 21, wherein the first rail and the second rail are spaced apart from and parallel to each other, wherein the second axis of the second curing device is spaced apart from and parallel to the first axis of the first curing device, wherein the first axis of the first curing device is parallel to a first print axis along which the first printhead moves, and wherein the second axis of the second curing device is parallel to a second print axis along which the second printhead moves.

\* \* \* \* \*